(12) United States Patent
Shindo et al.

(10) Patent No.: US 10,286,820 B2
(45) Date of Patent: May 14, 2019

(54) INTEGRAL SKIN FOAM MOLDED ARTICLE

(71) Applicant: TACHI-S CO., LTD., Tokyo (JP)

(72) Inventors: Takashi Shindo, Tokyo (JP); Hiroki Yoshihara, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 3 days.

(21) Appl. No.: 15/641,957

(22) Filed: Jul. 5, 2017

(65) Prior Publication Data

US 2018/0009354 A1 Jan. 11, 2018

(30) Foreign Application Priority Data

Jul. 5, 2016 (JP) .................... 2016-133195
Jul. 5, 2016 (JP) .................... 2016-133196
Jul. 5, 2016 (JP) .................... 2016-133197

(51) Int. Cl.
| | | |
|---|---|---|
| *B32B 3/10* | (2006.01) | |
| *B60N 2/70* | (2006.01) | |
| *B60N 2/58* | (2006.01) | |
| B29C 44/18 | (2006.01) | |
| B29K 75/00 | (2006.01) | |
| B29K 105/04 | (2006.01) | |
| B29L 31/30 | (2006.01) | |
| B29K 711/08 | (2006.01) | |

(Continued)

(52) U.S. Cl.
CPC .......... *B60N 2/7017* (2013.01); *B60N 2/5816* (2013.01); *B29C 44/1271* (2013.01); *B29C 44/182* (2013.01); *B29K 2075/00* (2013.01); *B29K 2105/04* (2013.01); *B29K 2711/08* (2013.01); *B29L 2031/3023* (2013.01); *B29L 2031/3026* (2013.01); *B60N 2/75* (2018.02); *B60N 2/80* (2018.02); *Y10T 428/19* (2015.01); *Y10T 428/233* (2015.01); *Y10T 428/24033* (2015.01)

(58) Field of Classification Search
CPC ............... Y10T 428/19; Y10T 428/192; Y10T 428/197; Y10T 428/233; Y10T 428/24033; Y10T 428/24942
See application file for complete search history.

(56) References Cited

U.S. PATENT DOCUMENTS

2003/0098113 A1  5/2003  Takei

FOREIGN PATENT DOCUMENTS

| CN | 101332782 A | 12/2008 |
|---|---|---|
| JP | 2000-190340 A | 7/2000 |

(Continued)

OTHER PUBLICATIONS

Chinese Office Action, dated Mar. 4, 2019, for Chinese Application No. 201710542911.0, 15 pages. (w/ English Machine Translation).

*Primary Examiner* — Alexander S Thomas
(74) *Attorney, Agent, or Firm* — Seed IP Law Group LLP

(57) ABSTRACT

An integral skin foam molded article includes: a skin formed by sewing a plurality of skin pieces in a bag shape; and a resin foam which is molded inside the skin integrally with the skin, wherein: at least one skin piece among the plurality of skin pieces has a surface material made of a natural leather, and includes a wadding material stacked on a back side of the surface material in a non-surface joined state and a lining material stacked on the wadding material; and in a shrinkage rate with respect to an in-plane compression load, a shrinkage rate of the lining material is smaller than a shrinkage rate of the wadding material.

6 Claims, 28 Drawing Sheets

(51) Int. Cl.
 *B29C 44/12* (2006.01)
 *B60N 2/75* (2018.01)
 *B60N 2/80* (2018.01)

(56) References Cited

FOREIGN PATENT DOCUMENTS

| | | |
|---|---|---|
| JP | 2002-210271 A | 7/2002 |
| JP | 2003-125892 A | 5/2003 |
| JP | 2009-107132 A | 5/2009 |

INTEGRAL SKIN FOAM MOLDED ARTICLE

CROSS-REFERENCE TO RELATED APPLICATION(S)

This application is based upon and claims the benefit of priority from Japanese Patent Application No. 2016-133195, filed on Jul. 5, 2016, Japanese Patent Application No. 2016-133196, filed on Jul. 5, 2016, and Japanese Patent Application No. 2016-133197, filed on Jul. 5, 2016, the entire contents of which are incorporated herein by reference.

BACKGROUND

1. Field of the Invention

The present invention relates to an integral skin foam molded article.

2. Description of the Related Art

An armrest or a headrest of a vehicle seat is produced in such a manner that a foam resin material is injected into a skin formed by sew ng a plurality of skin pieces in a bag shape, the foam resin material is foamed in the skin, and a resin foam is molded integrally with the skin.

In the headrest of the integral skin foam molded article described in JP-A2002-210271, a member which is formed by using a fabric as a surface material and stacking a wadding material made of an urethane slab on the back side of the surface material, is used as the skin pieces. The surface material and the wadding material are bonded to each other.

In the headrest of the integral skin foam molded article described in JP-A-2009-107132, the skin pieces of which the surface material is made of a natural leather are used. The natural leather as the surface material is typically unbonded with the wadding material in consideration of the file that a feeling is damaged by bonding with the wadding material. However, in the skin pieces of the headrest described in JP-A-2009-107132, the natural leather is bonded with the wadding material, the fuzz of the back surface of the natural leather is cut so that the feeling of the natural leather is maintained in spite of bonding with the wadding material, and a resin coating layer is formed on the back surface of the natural leather of which the fuzz is cut, so that the back surface of the natural leather becomes smooth.

A shrinkage occurs when the foam resin material is hardened. The wadding material contacting with the foam resin material follows the hardening and shrinkage of the foam resin material. In a case where the surface material is bonded with the wadding material, the surface material also follows the hardening and shrinkage of the foam resin material. However, in a case where the natural leather as the surface material and the wadding material are not bonded with each other, the natural leather may not follow the hardening and shrinkage of the foam resin material, a looseness may occur in the natural leather, and an appearance quality of the integral skin foam molded article may be damaged.

As in the skin pieces of the headrest described in JP-A-2009-107132, the natural leather and the wadding material can be bonded while the feeling of the natural leather is maintained. However, it is necessary that the fuzz of the back surface of the natural leather is cut, and the resin coating layer is formed on the back surface so that an increase of the number of manhours and an increase of a cost associated with the increase of the number of manhours become an obstacle.

Further, the armrest described in JP-A-2003-125892 A is an armrest with a storage body such as a cup holder. The skin is provided with a mounting hole in which the storage body is mounted. A foam resin material is injected into the skin in a state where the storage body is mounted in the mounting hole, and a resin foam is molded integrally with the skin and the storage body.

In order to prevent the leakage of the foam resin material from the mounting hole in which the storage body is mounted, an annular elastic material is fixed in a periphery of an opening of the mounting hole, the periphery of the mounting hole is brought into close contact with the outer circumferential surface of the storage body by the elasticity of the elastic material, and the elastic material is also brought into close contact with the outer circumferential surface of the storage body. An annular elastic material made of a soft rubber band, a hard rubber, or the like is used as the elastic material.

In the armrest with the storage body described in JP-A-2003-125892, the elastic material is expanded by the storage body, and the expanded elastic material is tightened, so that the periphery of the mounting hole of the skin and the elastic material are brought into close contact with the outer circumferential surface of the storage body. The tightening of the elastic material causes a resistance when the storage body is mounted in the mounting hole, and the inside of the skin when the storage body is mounted in the mounting hole is hollow. Therefore, there is a risk that the skin is crumpled due to the resistance by the tightening of the elastic material, and it takes an effort to mount the storage body.

SUMMARY

The present invention has been made in consideration of the above situation, and an object thereof is to provide an integral skin foam molded article in which an increase of the number of manhours and an increase of a cost are suppressed and an appearance quality is improved, the integral skin foam molded article including skin pieces having a surface material made of a natural leather.

Further, the present invention has been made in consideration of the above situation, and an object thereof is to provide an integral skin foam molded article in which a component is easily mounted into a mounting hole provided in a skin, and a leakage of a foam resin material from the mounting hole can be suppressed.

According to an aspect of the present invention, there is provided an integral skin foam molded article including: a skin formed by sewing a plurality of skin pieces in a bag shape; and a resin foam which is molded inside the skin integrally with the skin, wherein: at least one skin piece among the plurality of skin pieces has a surface material made of a natural leather, and includes a wadding material stacked on a back side of the surface material in a non-surface joined state and a lining material stacked on the wadding material; and in a shrinkage rate with respect to an in-plane compression load, a shrinkage rate of the lining material is smaller than a shrinkage rate of the wadding material.

According to the above aspect of the present invention, in the integral skin foam molded article which includes the skin pieces having the surface material made of the natural leather, the increase of the number of manhours and the increase of the cost can be suppressed, and the appearance quality thereof can be improved.

According to another aspect of the present invention, there is provided an integral skin foam molded article, including: a bag shaped skin which has a mounting hole into which a component is mounted; and a resin foam which is molded integrally with the skin and the component inside the skin in a state where the component is mounted in the mounting hole, wherein the component has a buried part which is stored inside the skin, the skin has a sealing part which is provided to extend inside the mounting hole from a periphery of an opening of the mounting hole, and the sealing part closely contacts with an outer circumferential surface of the buried part over the entire circumference in the state of being pulled in the skin along the outer circumferential surface of the buried part, and a foam resin material faulting the resin foam is impregnated into the sealing part.

According to the above aspect of the present invention, the integral skin foam molded article can be provided in which the component is easily mounted into the mounting hole provided in the skin, and the leakage of the foam resin material from the mounting hole can be suppressed.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
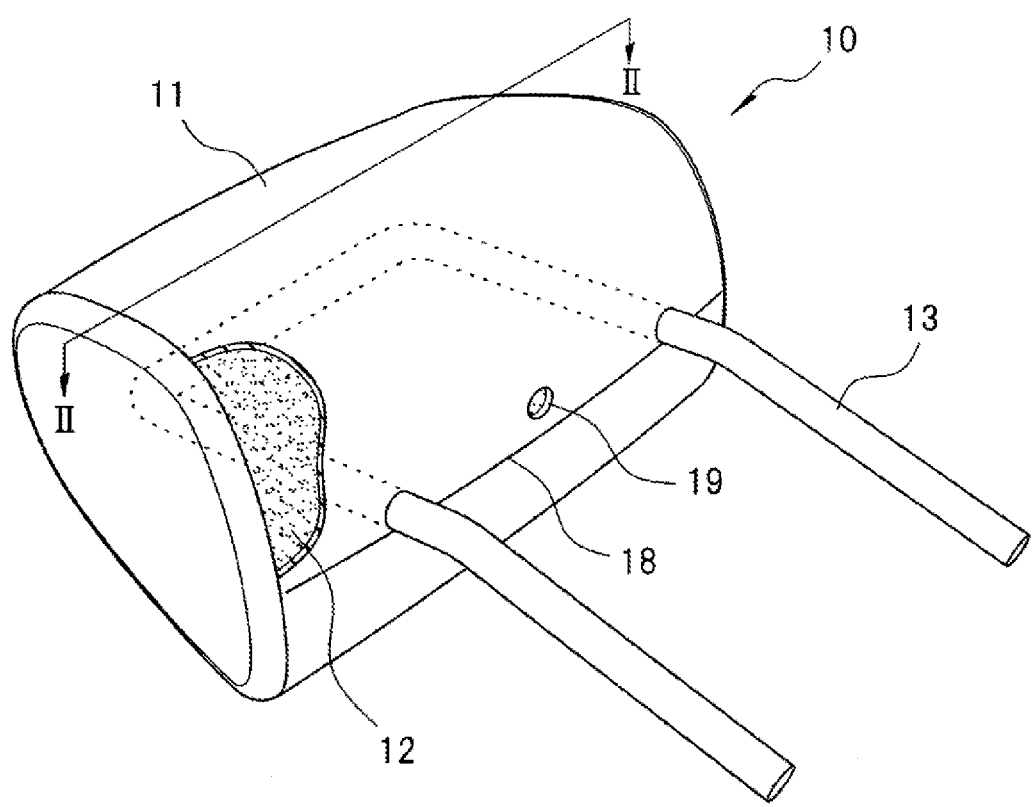
FIG. 1 is a perspective view of a headrest of a vehicle seat as an example of an integral skin foam molded article for explaining an embodiment of the present invention.

FIG. 1 illustrates an example of an integral skin foam molded article for explaining an embodiment of the present invention.

The integral skin foam molded article illustrated in FIG. 1 is a headrest 10 of the vehicle seat. The headrest 10 includes a skin 11, a resin foam 12 which is filled in the skin 11, a metal frame 13 which is embedded inside the resin foam 12, and of a pair of legs are exposed outside the skin 11.

The skin 11 is formed in a such manner that a plurality of skin pieces are sewn in a bag shape, and are turned over through a folded opening 18 such that an outlet seam is positioned on an inside, and the folded opening 18 is sewn up. The resin foam 12 is molded integrally with the skin 11 by foaming a foam resin material inside the skin 11. The foam resin material is not limited particularly, and a foam polyurethane may be illustrated as an example.

For example, the headrest 10 is produced as follows.

First, the frame 13 is mounted in the skin 11 by inserting the leg of the frame 13 into a through hole of the skin 11 sewn in a bag shape, and the folded opening 18 is sewn up. In addition, an injection nozzle of the foam resin material is mounted in a nozzle insertion opening 19 of the skin 11.

Next, the skin 11 mounted with the frame 13 and the injection nozzle is loaded in a cavity of a die for integral foam-molding. Further, the foam resin material is injected into the skin 11 through the injection nozzle. The foam resin material is foamed in the skin 11, so that the resin foam 12 is molded.

After the resin foam 12 has been molded, the skin 11, the resin foam 12, and the frame 13 are detached from the die for integral foam-molding, and the injection nozzle is detached from the nozzle insertion opening 19. The headrest 10 is obtained in the above manner.

Figure 2:
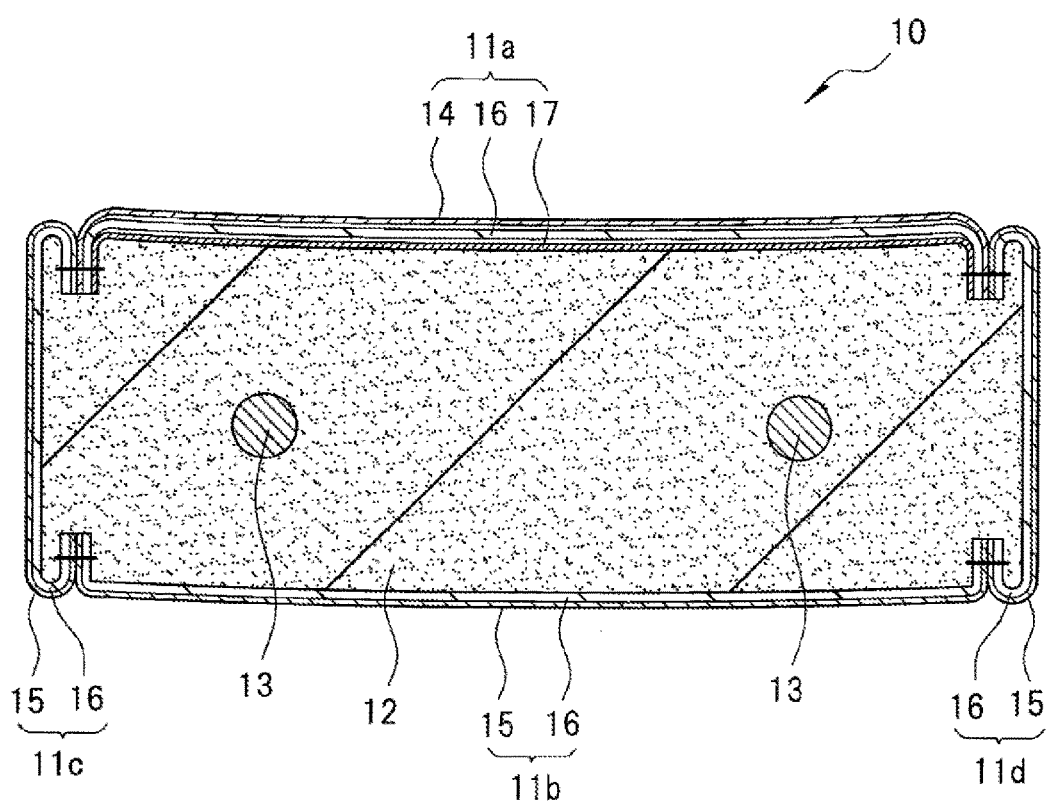
FIG. 2 is a sectional view taken along line II-II of the headrest of FIG. 1.

FIG. 2 illustrates a sectional surface of the headrest 10.

The skin 11 of the headrest 10 includes a skin piece 11a which configures a front surface contacting with a head of an occupant, a skin piece 11b which configures a rear surface, and skin pieces 11c and 11d which configure left and right side surfaces. Those four skin pieces are sewn in a bag shape to form the skin 11.

The skin piece 11a which configures the front surface is formed by three layers of a surface material 14 made of a natural leather, a wadding material 16 stacked on the back side of the surface material 14, and a lining material 17 stacked on the back side of the wadding material 16. The skin pieces 11b to 11d configuring the rear surface and the left and right side surfaces are firmed by two layers of a surface material 15 made of a synthetic leather or a fabric and the wadding material 16 stacked on the back side of the surface material 15.

The wadding material 16 is a seat material having a cushioning property, and a resin foam such as a soft polyurethane foam can be used as the wadding material 16. The lining material 17 is a seat material which has a smaller shrinkage rate with respect to an in-plane compression load than that of the wadding material 16. That is, in a case where the same in-plane compression load is applied to a regularly shaped test piece cut front each of the wadding material 16 and the lining material 17, the shrinkage amount of the test piece of the lining material 17 is smaller than the shrinkage amount of the test piece of the wadding material 16. A non-woven fabric and the like can be used as the lining material 17. In a case where the non-woven fabric is used, a non-woven fabric which has at most a 1 mm thickness and at least a 100 g/m$^2$ weight is preferably used as a general wadding material which has about a 3 mm thickness and is made of a soft polyurethane foam.

In the skin pieces 11b to 11d which are formed by the surface material 15 made of a synthetic leather or a fabric and the wadding material 16, the surface material 15 and the wadding material 16 are joined over the entire surface by a laminating process and the like.

On the other hand, in the skin piece 11a formed by the surface material 14 made of the natural leather, the wadding material 16, and the lining material 17, in order to maintain the feeling of the natural leather of the surface material 14, the surface material 14 and the wadding material 16 are in a non-surface joined state, and the surface material 14 and the wadding material 16 are separated from each other except a periphery which is sewn with other skin pieces.

The "non-surface joined state" indicates a state where two adjacent layers are not joined over the entire surface, and includes, for example, a state where the surface material 14 and the wadding material 16 are joined in a linear shape by a seam which sews the periphery the skin piece 11a with the periphery of the other skin pieces 11b to 11d, or a state where the surface material 14 and the wadding material 16 are joined partially in a dotted shape or a linear shape by a decorative stitch and the like provided in the central portion of the skin piece 11a except the periphery.

In an example illustrated in FIG. 2, the wadding material 16 and the lining material 17 are also in the non-surface joined state, and the wadding material 16 and the lining material 17 are separated except the periphery.

The foam resin material forming the resin foam 12 is hardened in the state of being infiltrated in the wadding material 16 of each of the skin pieces 11b to 11d and the lining material 17 of the skin piece 11a which are exposed to the inside of the skin 11. Accordingly, the resin foam 12 is integrated with the wadding material 16 of each of the skin pieces 11b to 11d and the lining material 17 of the skin piece 11a.

According to the hardening and shrinkage of the foam resin material, an in-plane shrinkage occurs in the wadding material 16 of each of the skin pieces 11b to 11d. In the skin pieces 11b to 11d, the surface material 15 and the wadding material 16 are surface-joined, and the surface material 15 follows the hardening and shrinkage of the foam resin material integrally with the wadding material 16.

According to the hardening and shrinkage of the foam resin material, the in-plane shrinkage can occur also in the lining material 17 of the skin piece 11a. In the skin piece 11a, the surface material 14 and the wadding material 16 are in the non-surface joined state, and further, in this example, the wadding material 16 and the lining material 17 are also in the non-surface joined state. Thus, in a case where the in-plane shrinkage occurs in the lining material 17, the surface material 14 does not follow the hardening and shrinkage of the foam resin material, and the looseness can occur in the surface material 14 by an amount of the hardening and shrinkage of the foam resin material. However, the shrinkage rate of the lining material 17 is smaller than the shrinkage rate of the wadding material 16, so that the hardening and shrinkage of the foam resin material contacting with the lining material 17 is suppressed. Accordingly, the looseness of the surface material 14 is suppressed.

As described above, the lining material 17 having a smaller shrinkage rate than that of the wadding material 16 is stacked on the back surface of the wadding material 16. Therefore, an additional process of the cutting of the fuzz of the back surface or the resin coating is not required with respect to the surface material 14 made of a natural leather, the looseness of the surface material 14 which is in the non-surface joined state with the wadding material 16 can be suppressed, and the feeling of the surface material 14 also can be maintained since the surface material 14 and the wadding material 16 are in the non-surface joined state. Accordingly, the increase of the number of manhours and the increase of the cost can be suppressed, and the appearance quality of the headrest 10 can be improved.

Figure 3:
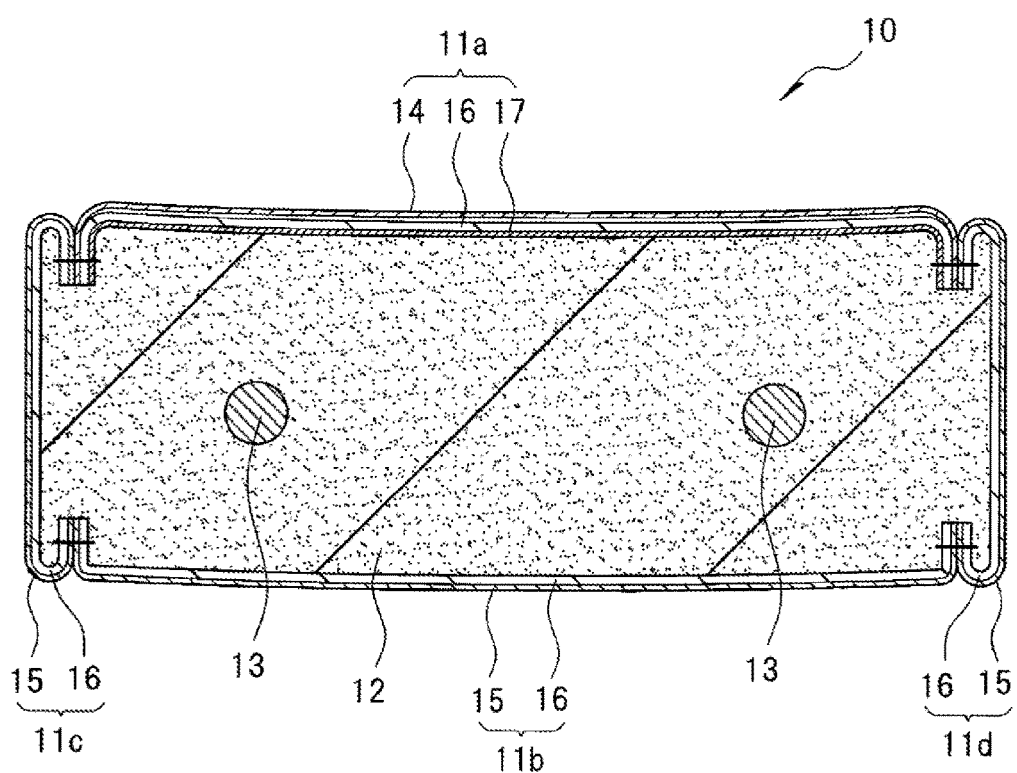
FIG. 3 is a sectional view of a modification of the headrest of FIG. 1.

In the example illustrated in FIG. 2, the wadding material 16 and the lining material 17 are in the non-surface joined state. However, as in the example illustrated in FIG. 3, the wadding material 16 and the lining material 17 may be joined over the entire surface by the laminating process and the like. A compression tolerance of the lining material 17 is developed by surface-joining of the wadding material 16 and the lining material 17. The hardening and shrinkage of the foam resin material contacting with the lining material 17 can be further suppressed, and the looseness of the surface material 14 can be further suppressed.

Figure 4:
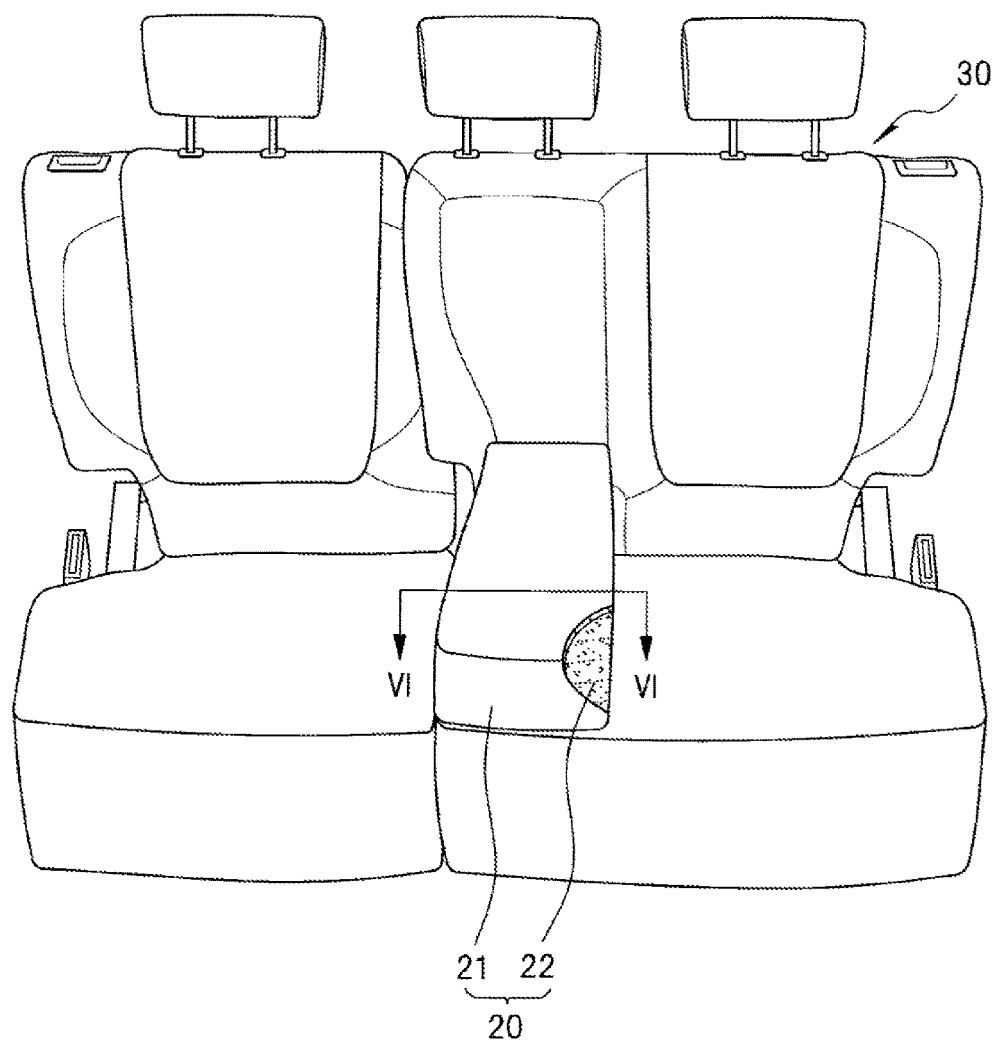
FIG. 4 is a perspective view of an armrest of the vehicle seat as an example of the integral skin foam molded article for explaining the embodiment of the present invention.
Figure 5:
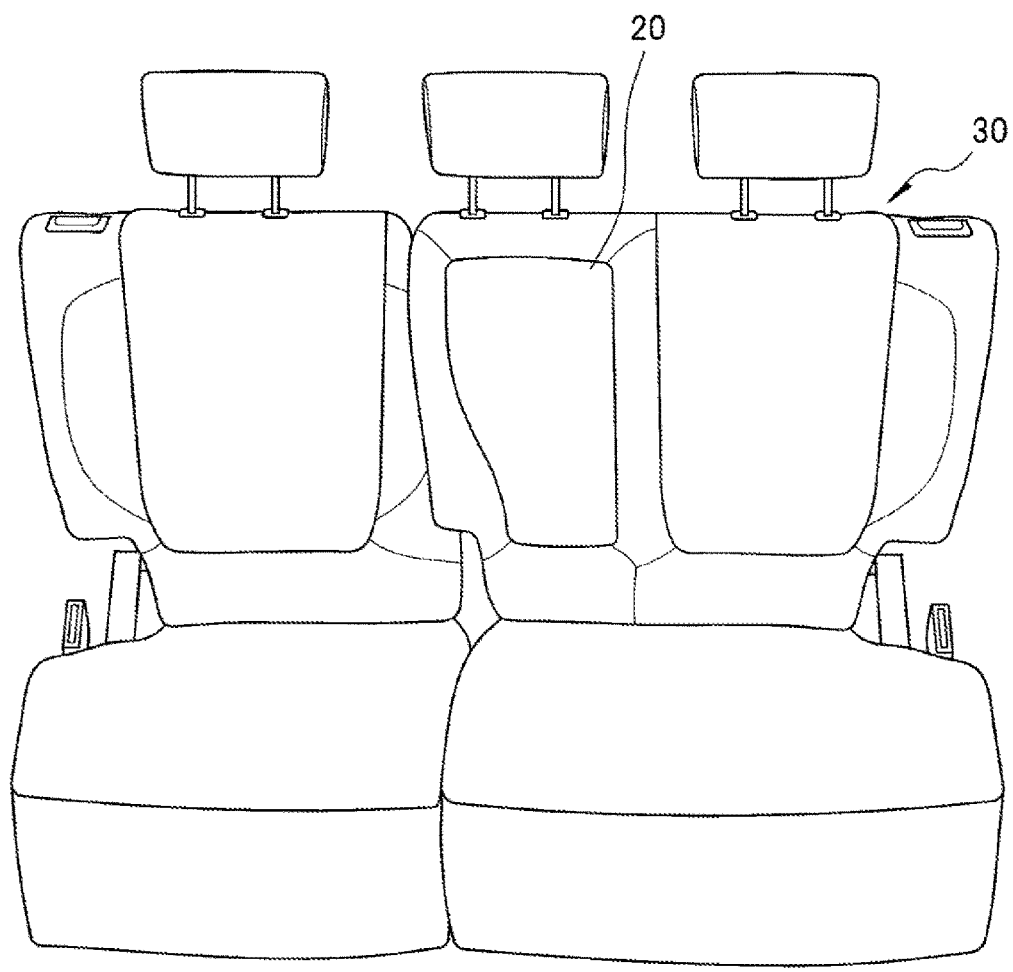
FIG. 5 is a perspective view of a state where the armrest of FIG. 4 is stored in a seat back.

FIGS. 4 and 5 illustrate another example of the integral skin foam molded article for explaining the embodiment of the present invention.

The integral skin foam molded article illustrated in FIGS. 4 and 5 is a drawer-type armrest 20 of the vehicle seat. FIG. 4 illustrates a state where the armrest 20 is drawn from a seat back 30, and FIG. 5 illustrates a state where the armrest 20 is stored in the seat back 30.

The armrest 20 includes a skin 21 and a resin foam 22 filled in the skin 21. Similarly to the skin 11 of the above-described headrest 10, the skin 21 is formed in such a manner that a plurality of skin pieces are sewn in a bag shape and are turned over through the folded opening such that the outlet seam is positioned on an inside, and the folded opening is sewn up. Similarly to the resin foam 12 of the above-described headrest 10, the resin foam 22 is molded integrally with the skin 21 by foaming the foam resin material inside the skin 21.

Figure 6:
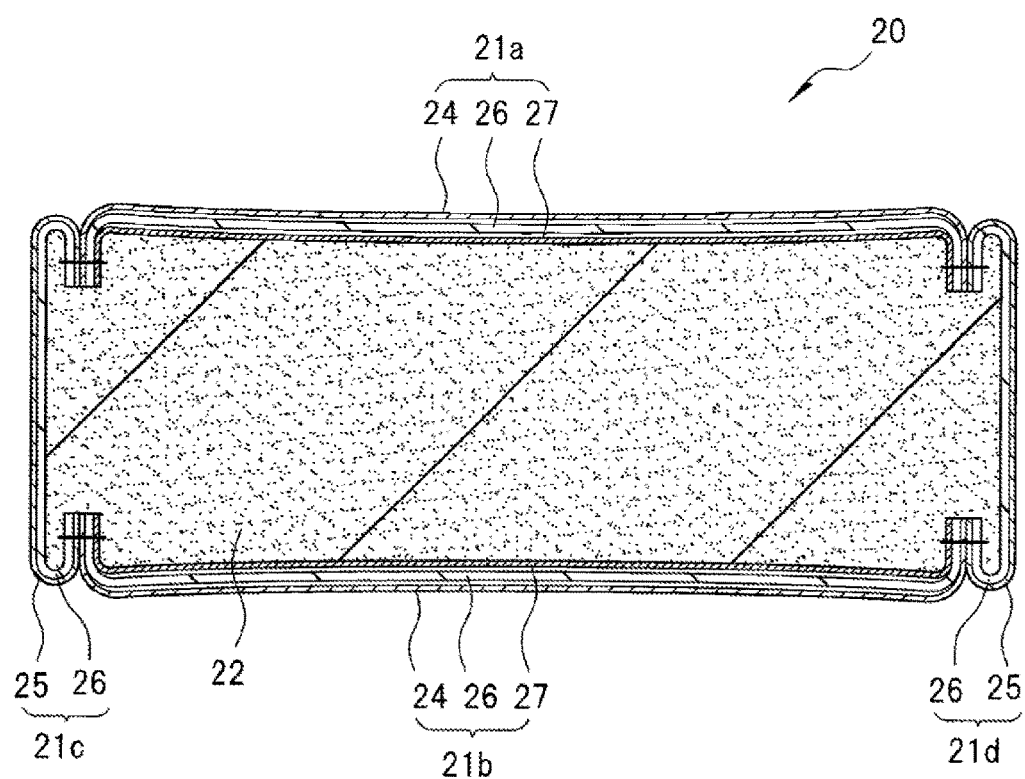
FIG. 6 is a sectional view of the armrest of FIG. 4 taken along line VI-VI.

FIG. 6 illustrates a sectional surface of the armrest 20.

The skin 21 of the armrest 20 includes a skin piece 21a which configures an upper surface on which the arm of the occupant is put in a state where the armrest 20 is drawn as illustrated in FIG. 4, a skin piece 21b which configures a lower surface, and skin pieces 21c and 21d which configure left and right side surfaces. The skin 21 is formed by sewing those four skin pieces in a bag shape.

The skin piece 21a configuring the upper surface and the skin piece 21b configuring the lower surface are formed by three layers of a surface material 24 made of a natural leather, a wadding material 26 stacked on the back side of the surface material 24, and a lining material 27 stacked on the back side of the wadding material 26. The skin pieces 21c and 21d configuring the left and right side surfaces are formed by two layers of the surface material 25 made of a synthetic leather or a fabric and the wadding material 26 stacked on the back side of the surface material 25.

The wadding material 26 is a seat material having a cushioning property. The lining material 27 is a seat material which has a smaller shrinkage rate with respect to the in-plane compression load than that of the wadding material 26.

In the skin pieces 21c and 21d which are formed by the surface material 25 made of a synthetic leather or a fabric and the wadding material 26, the surface material 25 and the wadding material 26 are joined over the entire surface.

On the other hand, in the skin pieces 21a and 21b which are formed by the surface material 24 made of the natural leather, the wadding material 26, and the lining mat 27, in order to maintain the feeling of the natural leather of the surface material 24, the surface material 24 and the wadding material 26 are in the non-surface joined state, and the surface a material 24 and the wadding material 26 are separated from each other except a periphery which is sewn with other skin pieces.

The foam resin material forming the resin foam 22 is hardened in the state of being infiltrated in the wadding material 16 of each of the skin pieces 21c and 21d and the lining material 27 of the skin pieces 21a and 21b which are exposed to the inside of the skin 21. Accordingly, the resin foam 22 is integrated with the wadding material 26 of each of the skin pieces 21c and 21d and the lining material 27 of each of the skin pieces 21a and 21b.

According to the hardening and shrinkage of the foam resin material, an in-plane shrinkage occurs in the wadding material 26 of each of the skin pieces 21c and 21d. In the skin pieces 21c and 21d, the surface material 25 and the wadding material 26 are surface-joined, and the surface material 25 follows the hardening and shrinkage of the foam resin material integrally with the wadding, material 26.

According to the hardening and shrinkage of the foam resin material, the in-plane shrinkage can occur also in the lining material 27 of each of the skin pieces 21a and 21b. In the skin pieces 21a and 21b, the surface material 24 and the wadding material 26 are in the non-surface joined state, and further, in this example, the wadding material 26 and the lining material 27 are also in the non-surface joined state. However, the shrinkage rate of the lining material 27 is smaller than the shrinkage rate of the wadding material 26, and the hardening and shrinkage of the foam resin material contacting with the lining material 27 is suppressed. Accordingly, the looseness of the surface material 24 is suppressed, and similarly to the above-described headrest 10, the increase of the number of manhours and the increase of the cost can be suppressed, and the appearance quality of the armrest 20 an be improved.

Figure 7:
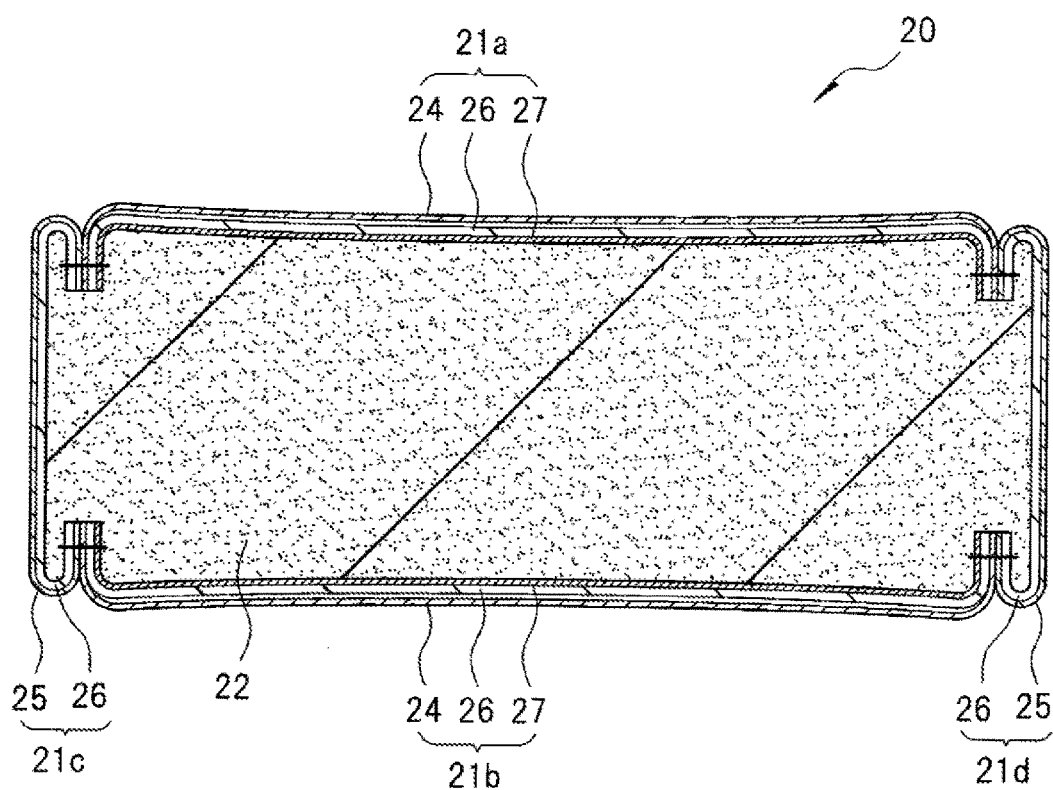
FIG. 7 is a sectional view of a modification of the armrest of FIG. 4.

In the example illustrated in FIG. 6, the wadding material 26 and the lining material 27 of each of the skin pieces 21a and 21b are in the non-surface joined state. However, as in the example illustrated in FIG. 7, the wadding material 26 and the lining material 27 may be joined over the entire surface. A compression tolerance of the lining material 27 is developed by surface-joining of the wadding material 26 and the lining material 27. The hardening and shrinkage of the foam resin material contacting with the lining material 27 can be further suppressed, and the looseness of the surface material 24 can be further suppressed.

Hereinbefore, the headrest 10 and the armrest 20 have been described as an example. However, the present invention can be applied to another integral skin foam molded article of the vehicle seat such as a seat cushion or a seat back of the vehicle seat. Further the present invention is not limited to components of the vehicle seat, and can be also applied to other integral skin foam molded articles.

Figure 8:
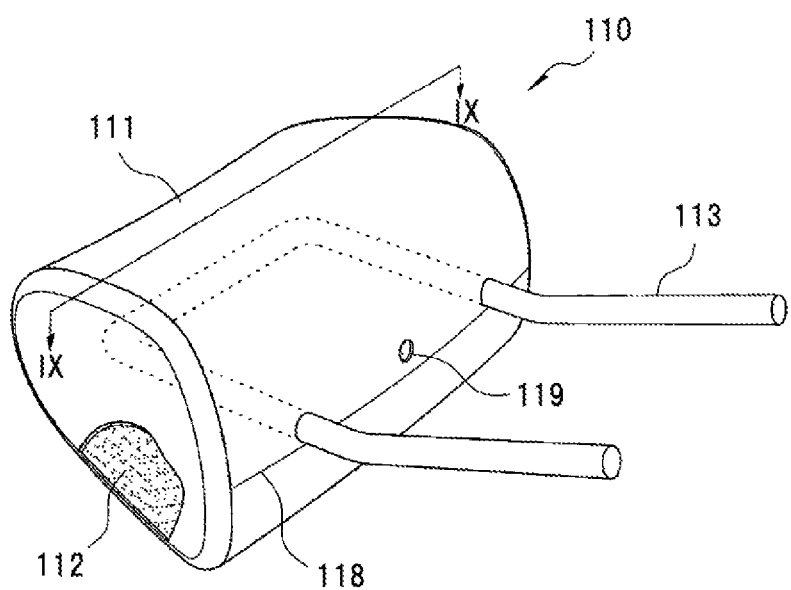
FIG. 8 is a perspective view of a headrest of a vehicle seat as an example of an integral skin foam molded article for explaining an embodiment of the present invention.

FIG. 8 illustrates an example of an integral skin foam molded article for explaining an embodiment of the present invention.

The integral skin foam molded article illustrated in FIG. 8 is a headrest 110 of the vehicle seat. The headrest 110 includes a skin 111, a resin foam 112 which is filled in the skin 111, a metal frame 113 which is embedded inside the resin foam 112, and of a pair of legs are exposed outside the skin 111.

The skin 111 is formed in a such manner that a plurality of skin pieces are sewn in a bag shape, and are turned over through a folded opening 118 such that an outlet seam is positioned on an inside, and the folded opening 118 is sewn up. The resin foam 112 is molded integrally with the skin 111 by foaming a foam resin material inside the skin 111. The foam resin material is not limited particularly, and a foam polyurethane may be illustrated as an example.

For example, the headrest 110 is produced as follows.

First, the frame 113 is mounted in the skin 111 by inserting the leg of the frame 113 into through hole of the skin 111 sewn in a bag shape, and the folded opening 118 is sewn up. In addition, an injection nozzle of the foam resin material is mounted in a nozzle insertion opening 119 of the skin 111.

Next, the skin 111 mounted with the frame 113 and the injection nozzle is loaded in a cavity of a die for integral foam-molding. Further, the foam resin material is injected into the skin 111 through the injection nozzle. The foam resin material is foamed in the skin 111, so that the resin foam 112 is molded.

After the resin foam 112 has been molded, the skin 111, the resin foam 112, and the frame 113 are detached from the die for integral foam-molding, and the injection nozzle is detached from the nozzle insertion opening 119. The headrest 110 is obtained in the above manner.

Figure 9:
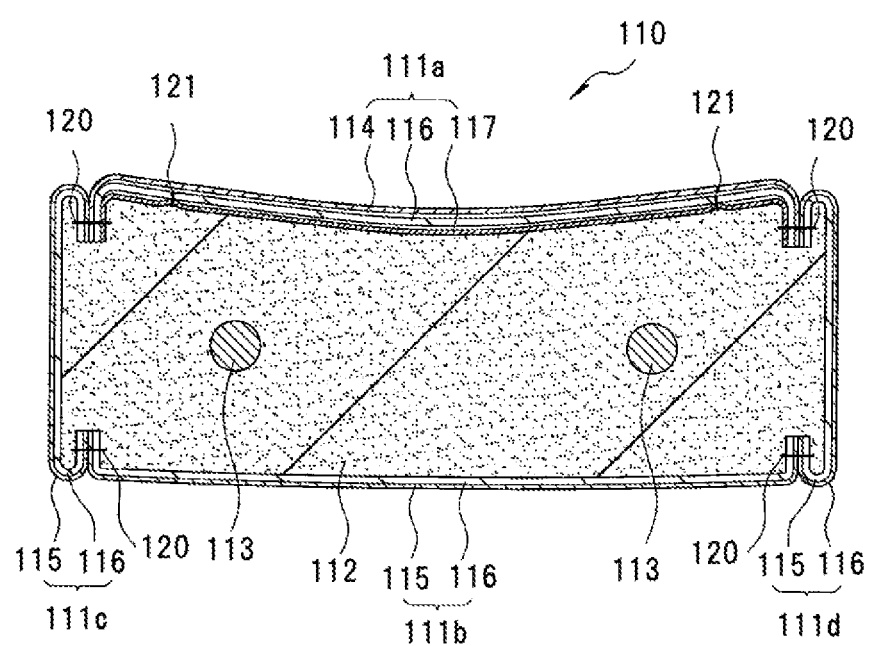
FIG. 9 is a sectional view taken along line IX-IX of the headrest of FIG. 8.

FIG. 9 illustrates a sectional surface of the headrest 110.

In the front surface of the headrest 110 contacting with the head of the occupant, the central portion in a width direction retreats with respect to both left and right side portions. The front surface is curved overall in a recessed shape on the sectional surface orthogonal to a vertical direction. The skin 111 of the headrest 110 includes a skin piece 111a configuring a front surface, a skin piece 111b configuring a rear surface, and skin pieces 111c and 111d configuring left and right side surfaces. The skin 111 is formed by sewing those four skin pieces in a bag shape. The skin piece 111a conforms to the curved shape of the front surface of the headrest 110, and is curved overall in a recessed shape.

The skin 111a which configures the front surface is formed by three layers of a surface material 114 made of a natural leather, a wadding material 116 stacked on the back side of the surface material 114, and a lining material 117 stacked on the back side of the wadding material 116. The skin pieces 111b to 111d configuring the rear surface and the left and right side surfaces are formed by two layers of a surface material 115 made of a synthetic leather or a fabric and the wadding material 116 stacked on the back side of the surface material 115.

The wadding material 116 is a seat material having a cushioning property, and a soft polyurethane foam and the like can be used as the wadding material 116. The lining material 117 is a seat material which has a smaller shrinkage rate with respect to an in-plane compression load than that of the wadding material 116. That is, in a case where the same in-plane compression load is applied to a regularly shaped test piece cut from each of the wadding material 116 and the lining material 117, the shrinkage amount of the test piece of the lining material 117 is smaller than the shrinkage amount of the test piece of the wadding material 116. A non-woven fabric and the like can be used as the lining material 117. In a case where the non-woven fabric is used, a non-woven fabric which has at most a 1 mm thickness and at least a 100 of $g/m^2$ weight is preferably used as a general wadding material which has about a 3 mm thickness and is made of a soft polyurethane foam.

In the skin pieces 111b to 111d which are formed by the surface material 115 made of a synthetic leather or a fabric and the wadding material 116, the surface material 115 and the wadding material 116 are joined over the entire surface by a laminating process and the like.

On the other hand, in the skin piece 111a formed by the surface material 114 made of the natural leather, the wadding material 116, and the lining material 117, in order to maintain the feeling of the natural leather of the surface material 114, the surface material 114 and the wadding material 116 are in a non-surface joined state, and the surface material 114 and the wadding material 116 are separated from each other except a periphery which is sewn with other skin pieces.

Incidentally, the "non-surface joined state" indicates a state where two adjacent layers are not joined over the entire surface, and includes, for example, a state where the surface material 114 and the wadding material 116 are joined in a linear shape by a seam 120 which sews the periphery of the skin piece 111a with the periphery of the other skin pieces 111b to 111d, or a state where the surface material 114 and the wadding material 116 are joined partially in a dotted shape or a linear shape by a decorative stitch and the like provided in the central portion of the skin piece 111a except the periphery.

In an example illustrated in FIG. 9, the wadding material 116 and the lining material 117 are also in the non-surface joined state. However, by the seam 120 provided in the periphery of the skin piece 111a, the wadding material 116 and the lining material 117 are joined in a linear shape. Further, by a two-row seam 121, which extends in the vertical direction and is provided in a curved portion (the central portion except the periphery) of the skin piece 111a which is curved overall in the recessed shape on the sectional surface orthogonal to the vertical direction, the wadding material 116 and the lining material 117 are partially joined in a linear shape.

The foam resin material forming the resin foam 112 is hardened in the state of being infiltrated in the wadding material 116 of each of the skin pieces 111b to 111d and the lining material 117 of the skin piece 111a which are exposed to the inside of the skin 111. Accordingly, the resin foam 112 is integrated with the wadding material 116 of each of the skin pieces 111b to 111d and the lining material 117 of the skin piece 111a.

According to the hardening and shrinkage of the foam resin material, an in plane shrinkage occurs in the wadding material 116 of each of the skin pieces 111b to 111d. In the skin pieces 111b to 111d, the surface material 115 and the wadding material 116 are surface-joined, and the surface material 115 follows the hardening and shrinkage of the foam resin material integrally with the wadding material 116.

According to the hardening and shrinkage of the foam resin material, the in-plane shrinkage can occur also in the lining material 117 of the skin piece 111a. In the skin piece 111a, the surface material 114 and the wadding material 116 are in the non-surface joined state, and further, in this example, the wadding material 116 and the lining material 117 are also in the non-surface joined state. Thus, in a case where the in-plane shrinkage occurs in the lining material 117, the surface material 114 does not follow the hardening and shrinkage of the foam resin material, and the looseness can occur in the surface material 114 by an amount of the hardening and shrinkage of the foam resin material. However, the shrinkage rate of the lining material 117 is smaller than the shrinkage rate of the wadding material 116, so that the hardening and shrinkage of the loam resin material contacting with the lining material 117 is suppressed. Accordingly, the looseness of the surface material 114 is suppressed.

As described above, the lining material 117 having a smaller shrinkage rate than that of the wadding material 116 is stacked on the back surface of the wadding material 116. Therefore, an additional process of the cutting of the fuzz of the back surface or the resin coating is not required with respect to the surface material 114 made of a natural leather, the looseness of the surface material 114 which is in the non-surface joined state with the wadding material 116 can be suppressed, and the feeling of the surface material 114 also can be maintained since the surface material 114 and the wadding material 116 are in the non-surface joined state. Accordingly, the increase of the number of manhours and the increase of the cost can be suppressed, and the appearance quality of the headrest 110 can be improved.

Herein the skin piece 111a including the lining material 117 is curved overall in the recessed shape on the sectional surface orthogonal to the vertical direction. The wadding material 116 is excellent in a flexibility against bending, and on the other hand, compared to the wadding material 116, the lining material 117 is inferior in a flexibility against bending, that is, folding easily occurs.

Figure 10:
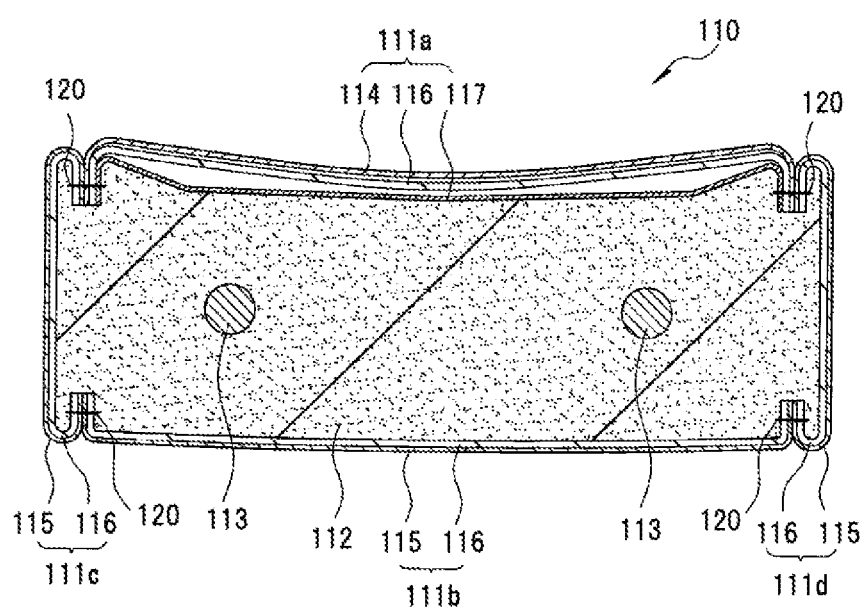
FIG. 10 is a sectional view of a reference example of the headrest.

In the skin of the reference example illustrated in FIG. 10, the seam 121 (see FIG. 9) which joins the wadding material 116 and the lining material 117 is not illustrated. While the surface material 114 and the wadding material 116 are curved to conform to the curved shape of the skin piece 111a, the lining material 117 does not follow the curved shape of the skin piece 111a, and the folding occurs in the lining material 117. The folding of the lining material 117 extends in the vertical direction in correspondence to the curved shape of the skin piece 111a.

In the folded lining material 117, a gap is provided between the wadding material 116 and the lining material 117. In a case where the foam resin material is injected into the skin 111 in the state such that the resin foam 112 is molded, the resin foam 112 is molded to conform to the shape of the lining material 117, and a void partially remains between the resin foam 112, and the surface material 114 and the wadding material 116 of the skin piece 111a. As a result, a recess partially occurs in the appearance of the headrest 110.

In this regard, in the example illustrated in FIG. 9, by the seam 121 which extends in the vertical direction, the wadding material 116 and the lining material 117 are partially joined in the linear shape. In the reference example illustrated in FIG. 10, the seam 121 is formed in the folded portion of the lining material 117 or in the vicinity thereof. In this manner, the formation place of the seam 121 can be appropriately determined on the basis of a trial. Incidentally, the joining of the wadding material 116 and the lining material 117 is not limited to the sewing by the seam 121, and may be performed by bonding, for example.

By joining the wadding material 116 and the lining material 117 by the seam 121, when the skin 111 is inflated, the lining material 117 is curved to be restrained by the wadding material 116. Accordingly, the folding of the lining material 117 is suppressed.

As described above, by joining at least partially the wadding material 116 and the lining material 117, the folding of the lining material 117 can be suppressed, and the resin foam 112 can be molded while the void does not remain between the resin foam 112 and the skin piece 111a. Accordingly, the appearance quality of the headrest 110 can be further improved.

Figure 11:
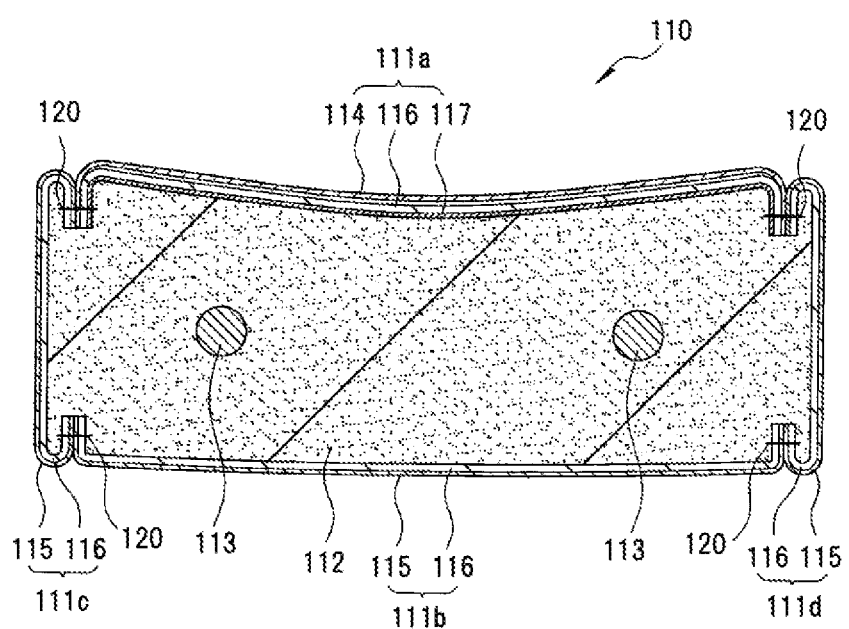
FIG. 11 is a sectional view of a modification of the headrest of FIG. 8.

Incidentally, in the example illustrated in FIG. 9, the wadding material 116 and the lining material 117 are joined partially in a linear shape by the seam 121. However, as in the example illustrated in FIG. 11, the wadding material 116 and the lining material 117 may be joined over the entire surface by the laminating process and the like. When the wadding material 116 and the lining material 117 are surface-joined, the compression tolerance of the lining material 117 is developed so that the hardening and shrinkage of the foam resin material contacting with the lining material 117 can be further suppressed, and the looseness of the surface material 114 can be further suppressed. Further, the folding of the lining material 117 can be further suppressed.

Figure 12:
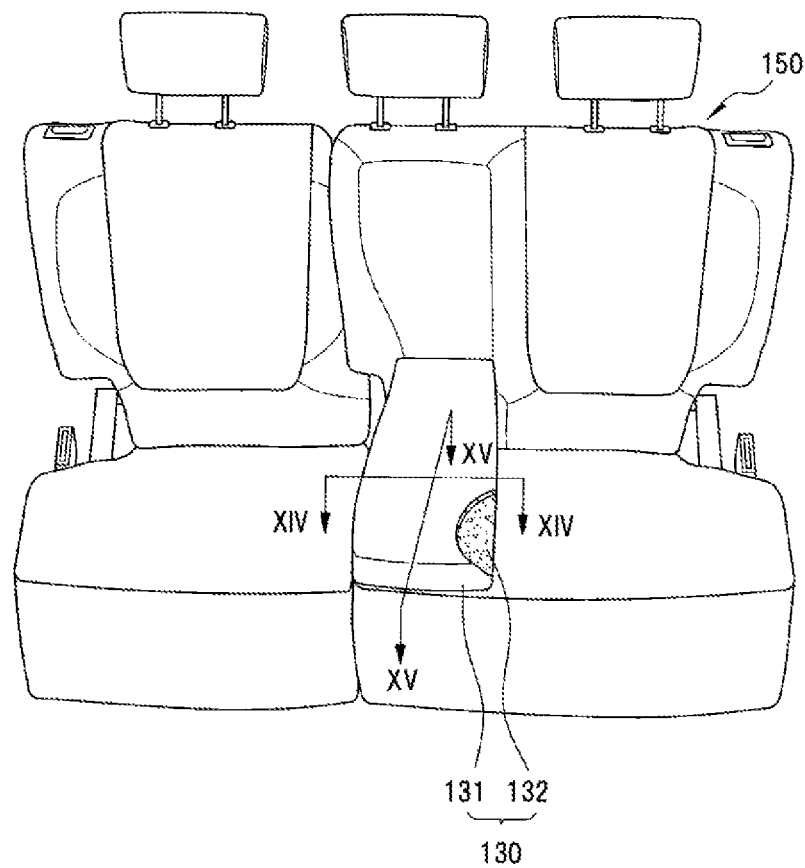
FIG. 12 is a perspective view of an armrest of the vehicle seat as an example of the integral skin foam molded article for explaining the embodiment of the present invention.
Figure 13:
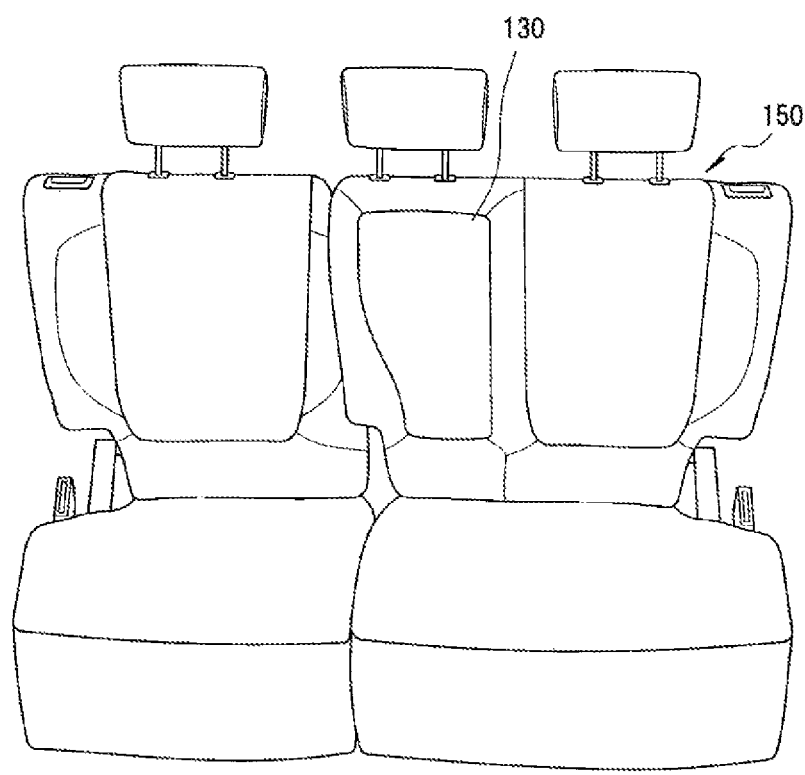
FIG. 13 is a perspective view of a state where the armrest of FIG. 12 is stored in a seat back.

FIGS. 12 and 13 illustrate another example of the integral skin foam molded article for explaining the embodiment of the present invention.

The integral skin foam molded article illustrated in FIGS. 12 and 13 is a drawer-type armrest 130 of the vehicle seat, and one end of the armrest 130 is rotatably supported by a seat back 150. FIG. 12 illustrates a state where the armrest 130 is drawn from the seat back 150, and FIG. 13 illustrates a state where the armrest 130 is stored in the seat back 150. Hereinafter, the one end which is rotatably supported by the seat back 150 is set as the base end of the armrest 130, and the opposite end is set as the tip of the armrest 130. In addition, in a state where the armrest 130 illustrated in FIG. 12 is drawn, the surface on which the arm of the occupant is put is set as the upper surface of the armrest 130, and the opposite surface is set as the lower surface of the armrest 130.

The armrest 130 includes a skin 131, and a resin foam 132 which is filled in the skin 131 and has a cushioning property. Similarly to the skin 111 of the above-described headrest 110, the skin 131 is formed in such a manner that a plurality of skin pieces are sewn in a bag shape and are turned over through the folded opening such that the outlet seam is positioned on an inside, and the folded opening is sewn up. Similarly to the resin foam 112 of the above-described headrest 110, the resin foam 132 is molded integrally with the skin 131 by foaming the foam resin material inside the skin 131.

Figure 14:
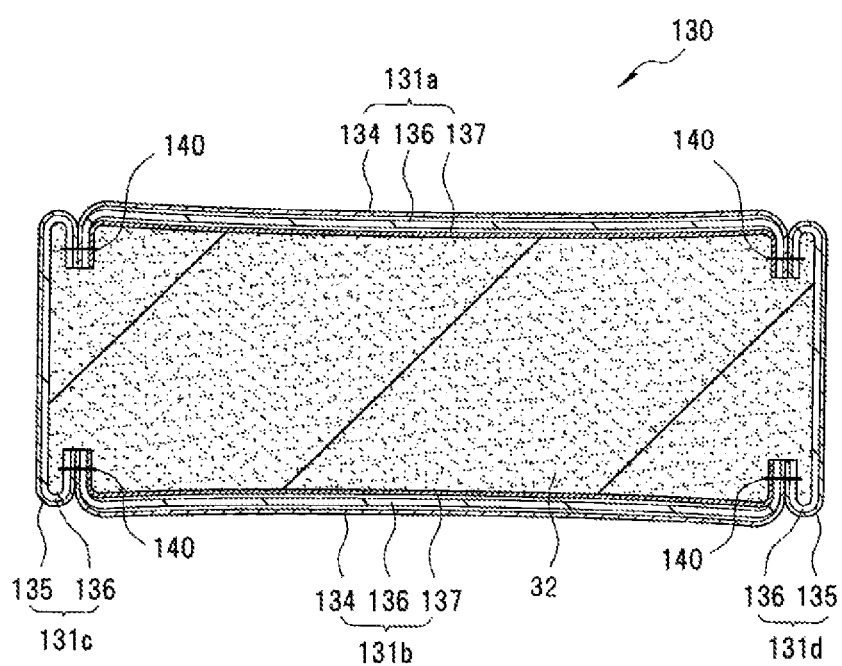
FIG. 14 is a sectional view of the armrest of FIG. 12 taken along line XIV-XIV.
Figure 15:
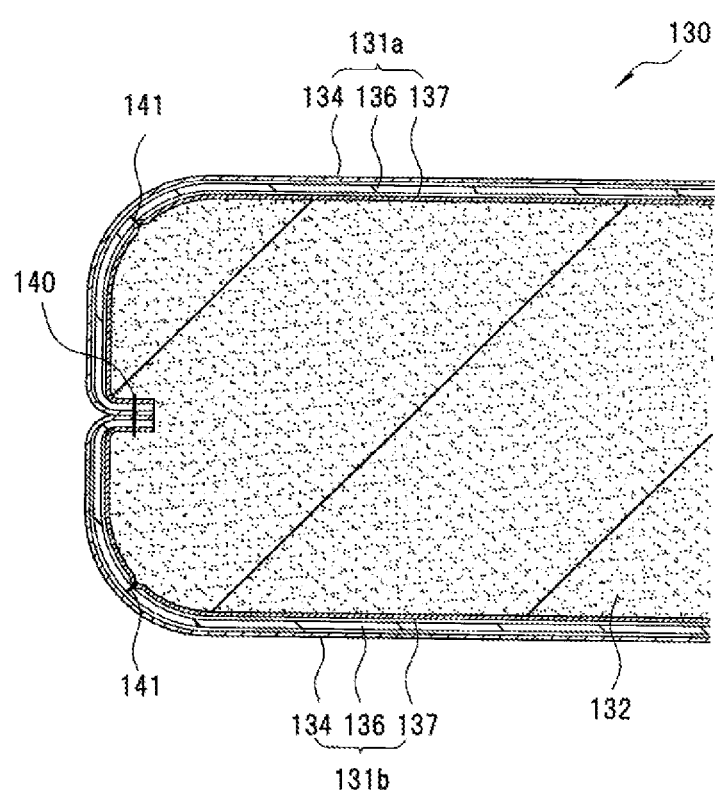
FIG. 15 is a sectional view of the armrest of FIG. 12 taken along line XV-XV.

FIGS. 14 and 15 illustrate a sectional surface of the armrest 130.

The tip of the armrest 130 is cursed in a convex shape from the upper surface of the armrest 130 to the lower surface. The skin 131 of the armrest 130 includes a skin piece 131a configuring an upper surface, a skin piece 131b configuring a lower surface, and skin pieces 131c and 131d configuring left and right side surfaces. The skin 131 is formed by sewing those four skin pieces in a bag shape. The skin pieces 131a and 131b are curved in the convex shape to conform to the curved shape of the tip of the armrest 130.

The skin piece 131a configuring the upper surface and the skin pieces 131b configuring the lower surface are formed by three layers of a surface material 134 made of a natural leather a wadding material 136 stacked on the back side of the surface material 134, and a lining material 137 stacked on the back side of the wadding material 136. The skin pieces 131c and 131d configuring the left and right side surfaces are formed by two layers of a surface material 135 made of a synthetic leather or a fabric and the wadding material 136 stacked on the back side of the surface material 135.

The wadding material 136 has a seat material having a cushioning property. The lining material 137 is a seat material which has a smaller shrinkage rate with respect to an in-plane compression load than that of the wadding material 136. Further, compared to the wadding material 136, the lining material 137 is inferior in a flexibility against bending, that is, folding easily occurs.

In the skin pieces 131c and 131d which are formed by the surface material 135 made of a synthetic leather or a fabric and the wadding material 136, the surface material 135 and the wadding material 136 are joined over the entire surface.

On the other hand, in the skin pieces 131a and 131b which are formed by the surface material 134 made of the natural leather, the wadding material 136, and the lining material 137, the surface material 134 and the wadding material 136 are in the non-surface joined state, and the surface material 134 and the wadding material 136 are separated from each other except a periphery which is sewn with other skin pieces.

In an example illustrated in FIGS. 14 and 15, the wadding material 136 and the lining material 137 are also in the non-surface joined state. However, by the seam 140 provided in the peripheries of the skin pieces 131a and 131b, the wadding material 136 and the lining material 137 are joined in a linear shape. Further, by a seam 141 which is provided in the curved portion of the skin pieces 131a and 131b and extends in the width direction, the wadding material 136 and the lining material 137 are partially joined in a linear shape.

The foam resin material forming the resin foam 132 is hardened in the state of being infiltrated in the wadding material 136 of each of the skin pieces 131c and 131d and the lining material 137 of the skin pieces 131a and 131b which are exposed to the inside of the skin 131. Accordingly, the resin foam 132 is integrated with the wadding material 136 of each of the skin pieces 131c and 131d and the lining material 137 of each of the skin pieces 131a and 131b.

According to the hardening and shrinkage of the foam resin material, an in-plane shrinkage occurs in the wadding material 136 of each of the skin pieces 131c and 131d. In the skin pieces 131c and 131d, the surface material 135 and the wadding material 136 are surface-joined, and the surface material 135 follows the hardening and shrinkage of the foam resin material integrally with the wadding material 136.

According to the hardening and shrinkage of the foam resin material, an in-plane shrinkage can occur also in the lining material 137 of each of the skin pieces 131a and 131b. However, the shrinkage rate of the lining material 137 is smaller than the shrinkage rate of the wadding material 136, so that the hardening and shrinkage of the foam resin material contacting with the lining material 137 is suppressed. Accordingly, the looseness of the surface material 134 of each of the skin pieces 131a and 131b can be suppressed, and similarly to the above-described headrest 110, the increase of the number of manhours and the increase of the cost can be suppressed, and the appearance quality of the armrest 130 can be improved.

By joining the wadding material 136 and the lining material 137 by the seam 141, when the skin 131 is inflated, the lining material 137 is curved to be restrained by the wadding material 136, and the folding of the lining material 137 is suppressed. Accordingly, the resin foam 132 can be molded while the void does not remain between the resin foam 132 and the skin pieces 131a and 131b, and the appearance quality of the armrest 130 can be further improved.

Figure 16:
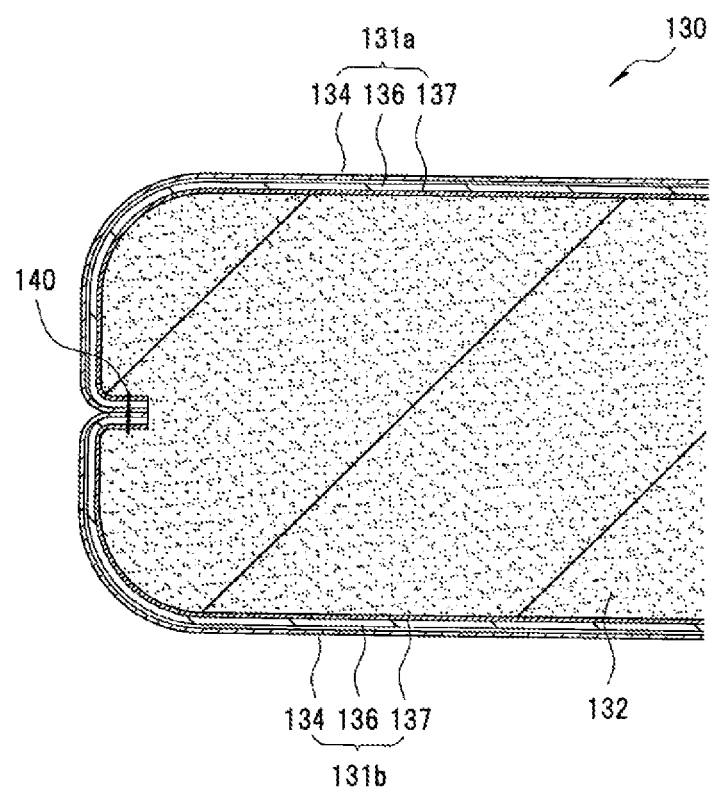
FIG. 16 is a sectional view of a modification of the armrest of FIG. 12.

Incidentally, in the example illustrated in FIGS. 14 and 15, the wadding material 136 and the lining material 137 of each of the skin pieces 131a and 131b are in the non-surface joined state. However, as in the example illustrated in FIG. 16, the wadding material 136 and the lining material 137 may be joined over the entire surface. When the wadding material 136 and the lining material 137 are surface-joined, the compression tolerance of the lining material 137 is developed so that the hardening and shrinkage of the foam resin material contacting with the lining material 137 can be further suppressed, and the looseness of the surface material 134 can be further suppressed. Further, the folding of the lining material 137 can be further suppressed.

Hereinbefore, the headrest 110 and the armrest 130 have been described as an example. However, the present invention can be applied to another integral skin foam molded article of the vehicle seat such as a seat cushion or a seat back of the vehicle seat. Further, the present invention is not limited to components of the vehicle seat, and can be also applied to other integral skin foam molded articles.

Figure 17:
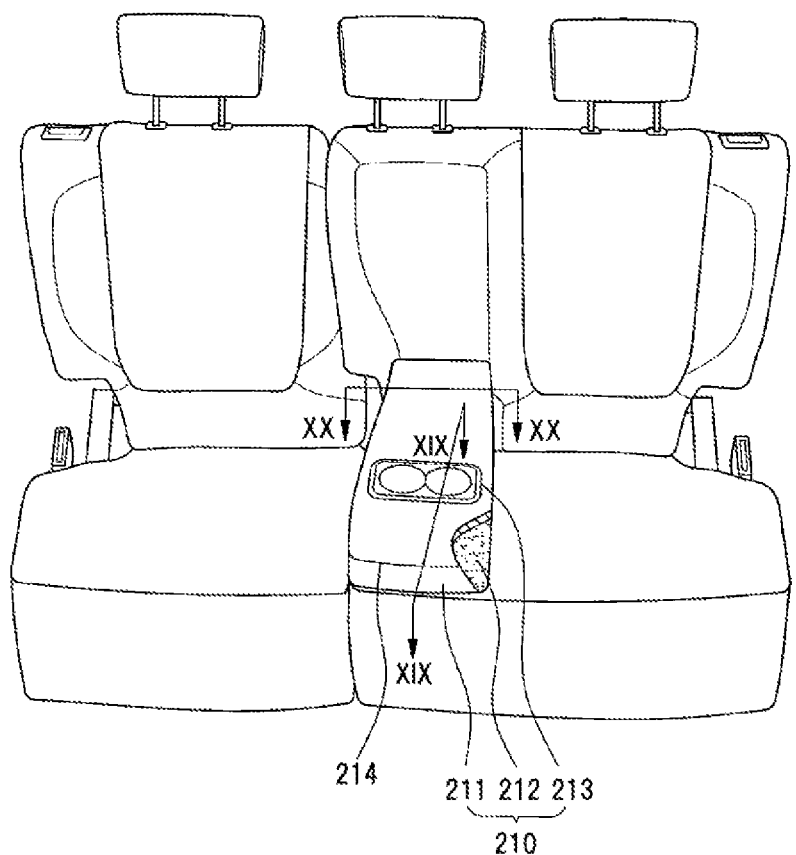
FIG. 17 is a perspective view of an armrest of a vehicle seat as an example of an integral skin foam molded article for explaining an embodiment of the present invention.
Figure 18:
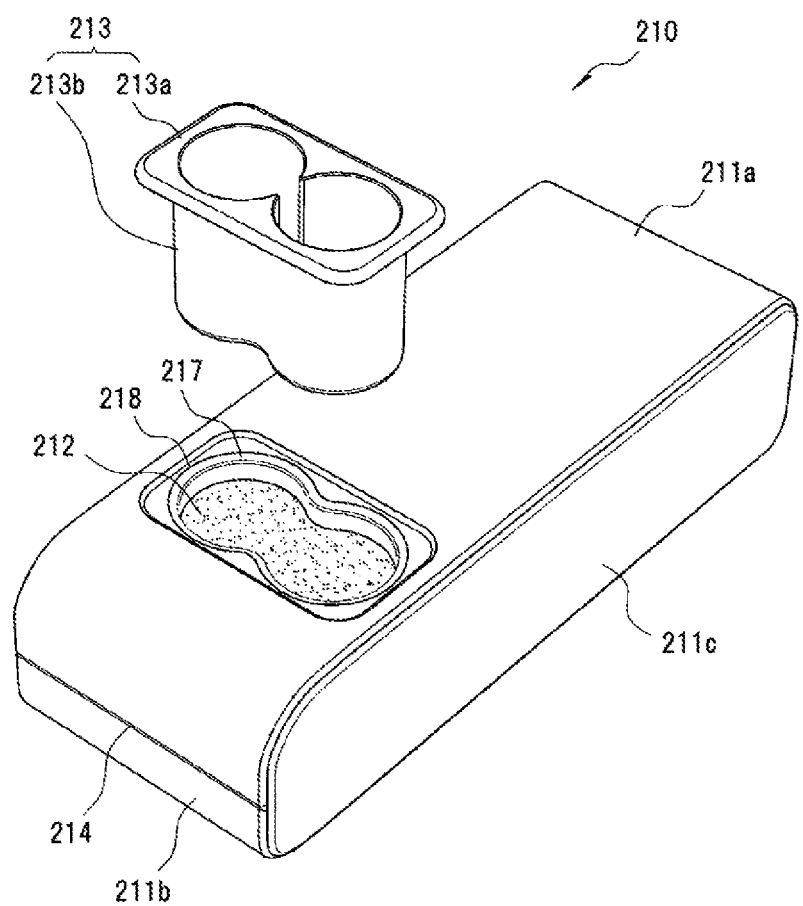
FIG. 18 is an exploded perspective view of the armrest of FIG. 17.

FIGS. 17 and 18 illustrate an example of an integral skin foam molded article for explaining an embodiment of the present invention.

The integral skin foam molded article illustrated in FIGS. 17 and 18 is a drawer-type armrest 210 of a vehicle seat. FIG. 17 illustrates a state where the armrest 210 is drawn from a seat back.

The armrest 210 includes a skin 211, a resin foam 212 filled in the skin 211, and a cup holder 213 as a component which is mounted in the skin 211.

The skin 211 of the armrest 210 is formed in such a manner that a plurality of skin pieces are sewn in a bag shape and are turned over through a folded opening 214 such that the outlet seam is positioned on an inside, and the folded opening 214 is sewn up. A mounting hole 218 in which the cup holder 213 is mounted is formed on an upper surface of the skin 211 on which an arm of an occupant is put in a state where the armrest 210 is drawn.

The cup holder 213 includes a flange 213a which is disposed in overlap with the periphery of the opening of the mounting hole 218 outside the skin 211, and a buried part 213b which is stored in the skin 211 through the mounting hole 218. The cup holder 213 is made of a synthetic resin material, for example, and the flange 213a and the buried part 213b are formed integrally.

In the resin foam 212, a foam resin material is foamed in the skin 211 in a state where the cup holder 213 is mounted in the mounting hole 218, and the skin 211 and the cup holder 213 are molded integrally. The foam resin material is not limited particularly, and foam polyurethane may be illustrated as an example.

Figure 19:
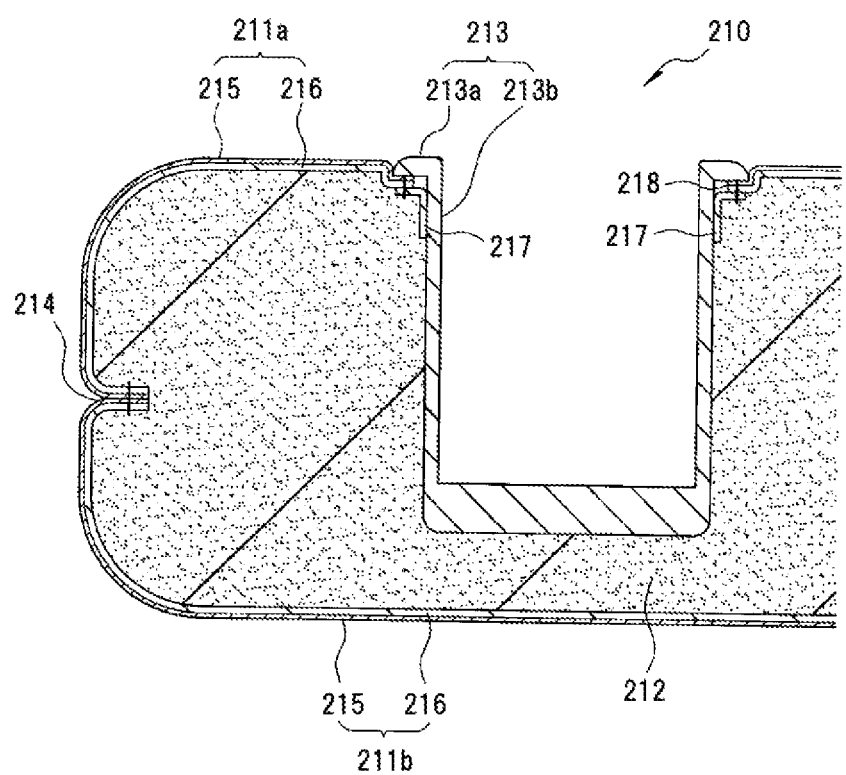
FIG. 19 is a sectional view taken along line XIX-XIX of FIG. 17.
Figure 20:
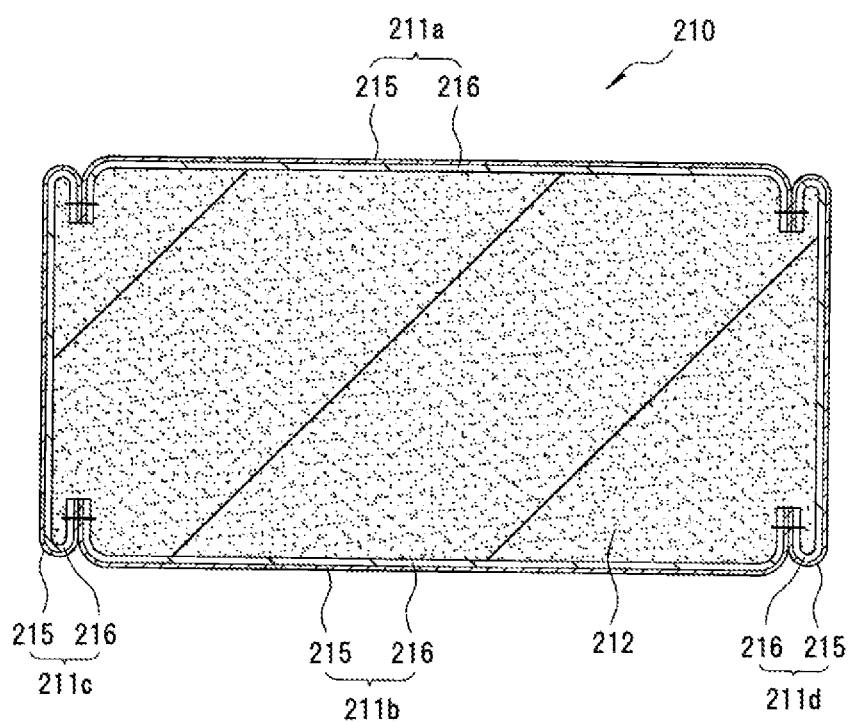
FIG. 20 is a sectional view taken along line XX-XX of FIG. 17.

FIGS. 19 and 20 illustrate a sectional surface of the armrest 210.

The skin 211 of the armrest 210 includes a skin piece 211a which configures an upper surface on which the arm of the occupant is put in a state where the armrest 210 is drawn as illustrated in FIG. 17, a skin piece 211b which configures a lower surface, and skin pieces 211c and 211d which configure left and right side surfaces. The skin 211 is formed by sewing those four skin pieces in a bag shape.

All the skin pieces 211a to 211d are formed by two layers of a surface material 215 made of a synthetic leather or a fabric and a wadding material 216 stacked on the back side of the surface material 215. The wadding material 216 is a seat material having a cushioning property, and a resin foam such as a soft polyurethane foam can be used as the wadding material 216.

In the surface material 215 made of a synthetic leather or a fabric and the wadding material 216 are joined over the entire surface by the laminating process, for example. The skin pieces 211a to 211d are formed by cutting from an original fabric formed by joining the surface material 215 and the wadding material 216.

The mounting hole 218 is formed in the skin piece 211a configuring the upper surface. A sealing part 217 closely contacting with the entire circumference in the outer circumferential surface of the buried part 213b of the cup holder 213 mounted in the mounting hole 218 is provided in the skin piece 211a.

The sealing part 217 is made of a flexible seat material into which the foam resin material forming the resin foam 212 is impregnable, and a resin foam such as a soft polyurethane foam can be used as the sealing part 217. In this example, the wadding material 216 is made of a resin foam such as a soft polyurethane foam, and the sealing part 217 is formed by using the wadding material. Particularly, in this example in which the wadding material 216 configuring the skin piece 211a is joined over the entire surface of the surface material 215, the sealing part 217 is formed separately from the wadding material 216 configuring the skin piece 211a. The material can be utilized efficiently when the sealing part 217 is formed by using the wadding material.

The sealing part 217 which is a separate body from the wadding material 216 configuring the skin piece 211a is formed in an annular shape corresponding to the shape of the mounting hole 218. Further, the outer periphery of the sealing part 217 is overlapped with the periphery of the opening of the mounting hole 218 on the back side of the skin piece 211a, and is joined with the periphery of the opening of the mounting hole 218 by sewing, bonding, or the like.

The inner periphery of the sealing part 217 is disposed to extend inside the mounting hole 218 from the periphery of the opening of the mounting hole 218. Further, the inner periphery of the sealing part 217 is pulled in the skin 211 along the outer circumferential surface of the buried part 213b of the cup holder 213 stored in the skin 211 through the mounting hole 218, and closely contacts with the outer circumferential surface of the buried part 213b over the entire circumference in the state of being pulled in.

The producing process of the armrest 210 will be described with reference to FIGS. 21 and 22.

Figure 21:
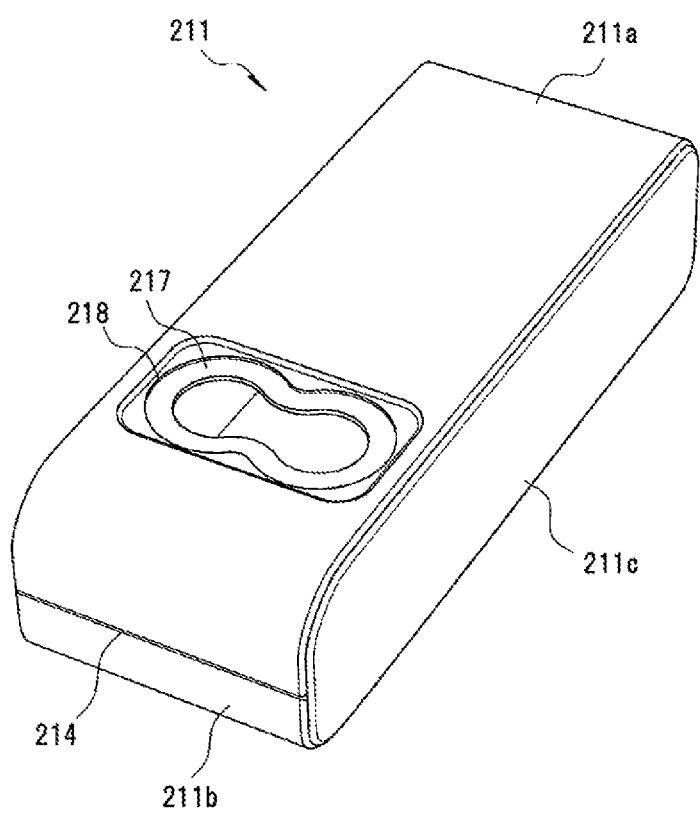
FIG. 21 is a perspective view illustrating a producing process of the armrest of FIG. 17.

First, as illustrated in FIG. 21, the skin 211 is turned over through the folded opening 214 such that the outlet seam of the skin 211 sewn in a bag shape is positioned on an inside, and the folded opening 214 is sewn up. The sealing part 217 is joined with the skin piece 211a. The inner periphery of the sealing part 217 is disposed to extend inside the mounting hole 218 from the periphery of the opening of the mounting hole 218.

Figure 22:
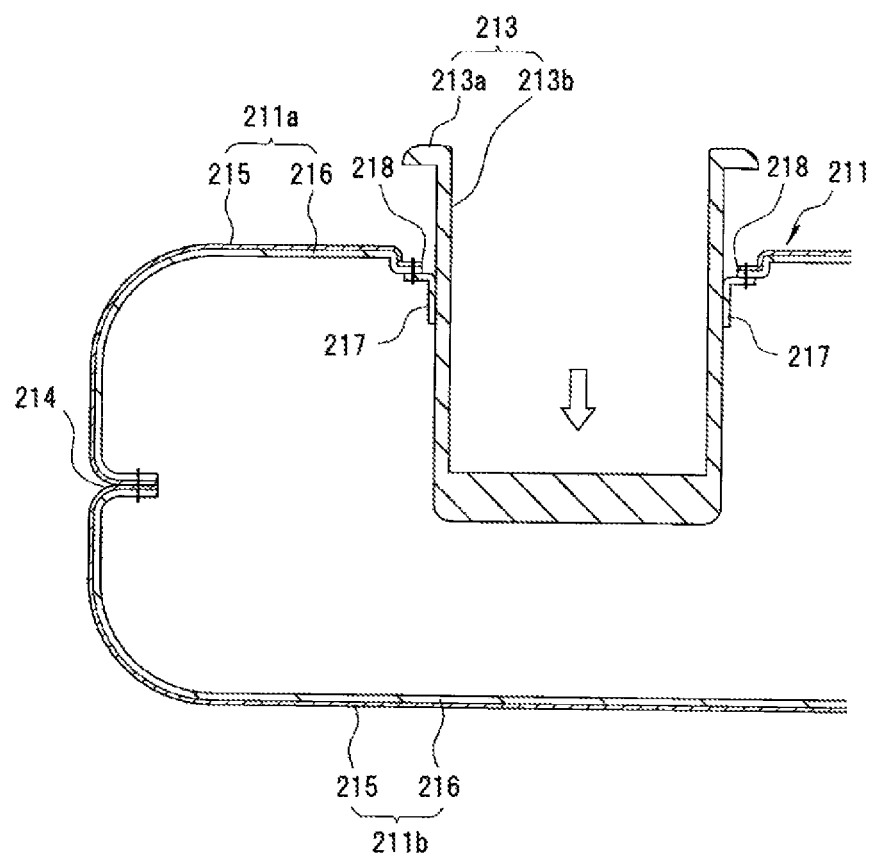
FIG. 22 is a sectional view illustrating a producing process of the armrest of FIG. 17 which is followed by FIG. 21.

Next, as illustrated in FIG. 22, the buried part 213b of the cup holder 213 is inserted into the skin 211 through the mounting hole 218. At that time, the inner periphery of the sealing part 217, which is disposed to extend inside the mounting hole 218 from the periphery of the opening of the mounting hole 218, is pulled in the skin 211 along the outer circumferential surface of the buried part 213b. Since the sealing part 217 is flexible, the inner periphery of the sealing part 217 pulled in the skin 211 is easily deformed to conform to the shape of the outer circumferential surface of the buried part 213b. Accordingly, an insertion resistance of the buried part 213b into the mounting hole 218 is reduced, and the crumpling or the deformation of the skin 211 according to the insertion of the buried part 213b into the mounting hole 218 is suppressed. Accordingly, the mounting operation of the cup holder 213 into the mounting hole 218 is easily performed.

Next, an injection nozzle of the foam resin material is mounted in a nozzle insertion opening (not illustrated) provided in the skin 211. The skin 211 is loaded in a cavity of a die for integral foam-molding in a state where the cup holder 213 and the injection nozzle are mounted. Further, the foam resin material is injected into the skin 211 through the injection nozzle. The foam resin Material is foamed in the skin 211, so that the resin foam 212 is molded.

Herein, the foam resin material injected into the skin 211 is infiltrated into the wadding material 216 and the sealing part 217 of each of the skin pieces 211a to 211d which are exposed to the inside of the skin 211, and the foam resin material infiltrated into the wadding material 216 and the sealing part 217 is also foamed. At that time, the sealing part 217 is inflated according to the foaming of the foam resin material infiltrated into the sealing part 217. The inner periphery of the sealing part 217 is pushed by the outer circumferential surface of the buried part 213b, and is tightly brought into close contact with the outer circumferential surface of the buried part 213b over the entire circumference. Accordingly, the leakage of the foam resin material from the mounting hole 218 is suppressed.

After the resin foam 212 has been molded, the skin 211, the resin foam 212, and the cup holder 213 are extracted from the die for integral foam-molding, and the injection nozzle is detached from the nozzle insertion opening. The armrest 210 is obtained by the above process.

As described above, when the flexible sealing part 217 into which the foam resin material is impregnable is provided in the mounting hole 218 of the skin 211 in which the cup holder 213 is mounted, the mounting operation of the cup holder 213 into the mounting hole 218 is easily performed, and the leakage of the foam resin material from the mounting hole 218 can be suppressed.

Figure 23:
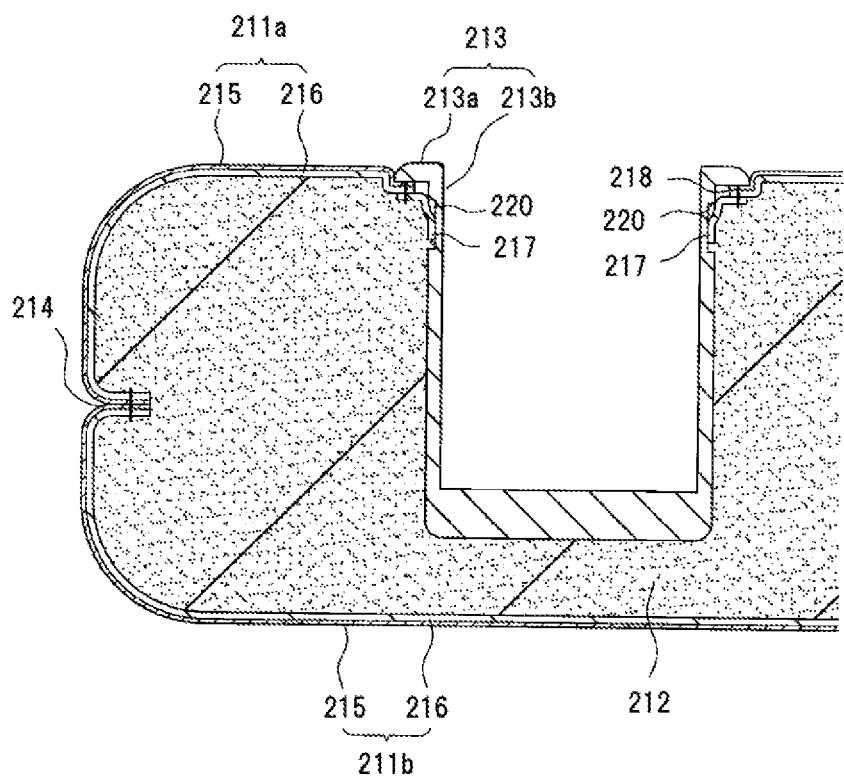
FIG. 23 is a sectional view of a modification of the armrest of FIG. 17.

FIG. 23 illustrates a modification of the armrest 210.

In the example illustrated in FIG. 23, an annular recess portion 220 is provided in the outer circumferential surface of the buried part 213b of the cup holder 213 with which the inner periphery of the sealing part 217 closely contacts, and at least a portion of the inner periphery of the sealing part 217 is contained in the recess portion 220. Accordingly, a labyrinth seal of a concavo-convex shape is configured between the buried part 213b and the sealing part 217, a sealing performance is developed, and the leakage of the foam resin material from the mounting hole 218 can be further suppressed.

Figure 24:
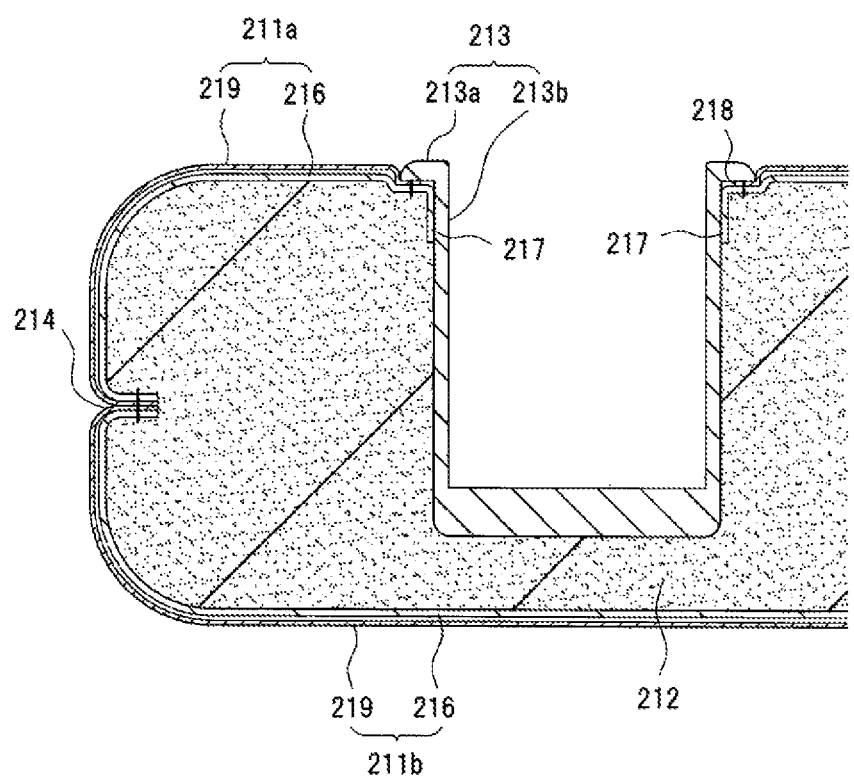
FIG. 24 is a sectional view of another modification of the armrest of FIG. 17.

FIG. 24 illustrates another modification of the armrest 210.

In the example illustrated in FIG. 24, among the skin pieces 211a to 211d forming the skin 211, the skin piece 211a which configures the upper surface on which the arm of the occupant is put in a state where the armrest 210 is drawn, and the skin piece 211b which configures the lower surface contacting with the middle of the back of the occupant in a state where the armrest 210 is stored are formed by two layers of a surface material 219 made of a natural leather and the wadding material 216 stacked on the back side of the surface material 219.

In order to maintain the feeling of the natural leather, the surface material 219 and the wadding material 216 are in a non-surface joined state, and the surface material 219 and the wadding material 216 are separated from each other except a periphery which is sewn with other skin pieces. Incidentally, the "non-surface joined state" indicates a state where two adjacent layers are not joined over the entire surface, and includes, for example, a state where the surface material 219 and the wadding material 216 are joined in a linear shape by a seam which sews the periphery of the skin piece 211a with the periphery of the other skin pieces 211b to 211d, or a state where the surface material 219 and the wadding material 216 are joined partially in a dotted shape or a linear shape by a decorative stitch and the like provided in the central portion of the skin piece 211a except the periphery.

The wadding material 216 in the non-surface joined state with the surface material 219 can be formed in a shape different from the surface material 219. In this regard, in this example, the sealing part 217 is formed integrally with the wadding material 216 configuring the skin piece 211a. That is, the mounting hole 218 is formed in the surface material 219 configuring the skin piece 211a, and similarly the through hole smaller than the mounting hole 218 is formed in the wadding material 216 configuring the skin piece 211a. An extension part which is disposed to extend inside the mounting hole 218 from the periphery of the opening of the mounting hole 218 is provided in the wadding material 216, and the extension part serves as the sealing part 217.

As described above, by forming the sealing part 217 integrally with the wadding material 216 configuring the skin piece 211a, an operation to join the sealing part 217 formed separately from the wadding material 216 with the skin piece 211a can be omitted, and an efficiency of producing the armrest 210 can be improved.

Figure 25:
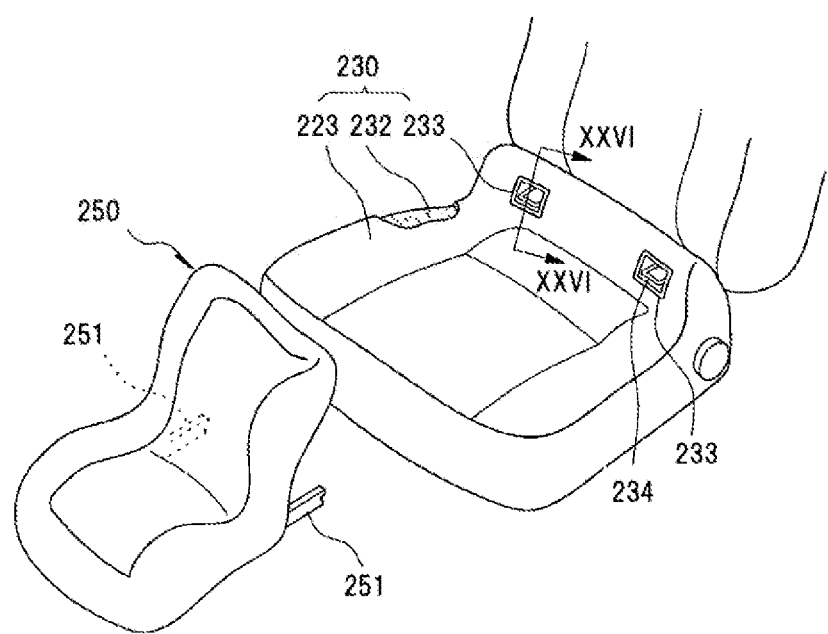
FIG. 25 is a perspective view of a seat cushion of the vehicle seat as another example of the integral skin foam molded article for explaining the embodiment of the present invention.

FIG. 25 illustrates another example of the integral skin foam molded article for explaining the embodiment of the present invention.

The integral skin foam molded article illustrated in FIG. 25 is a seat cushion 230 of the vehicle seat in which a child seat 250 is detachable. A pair of hooks 251 for fixing are provided in the child seat 250, and a pair of anchors 234 respectively engaged with the hooks 251 are disposed in the rear end of the seat surface of the seat cushion 230. For example, the anchors 234 are fixed in a vehicle floor, and reach the seat surface from the side opposite to the seat surface of the seat cushion 230 through a notch formed in the seat cushion 230.

The seat cushion 230 includes a skin 231, a resin foam 232 filled in the skin 231, and a pair of guide cups 233 as components mounted in the skin 231. Each of the guide cups 233 surrounds the anchors 234 disposed in the rear end of the seat surface of the seat cushion 230.

Figure 26:
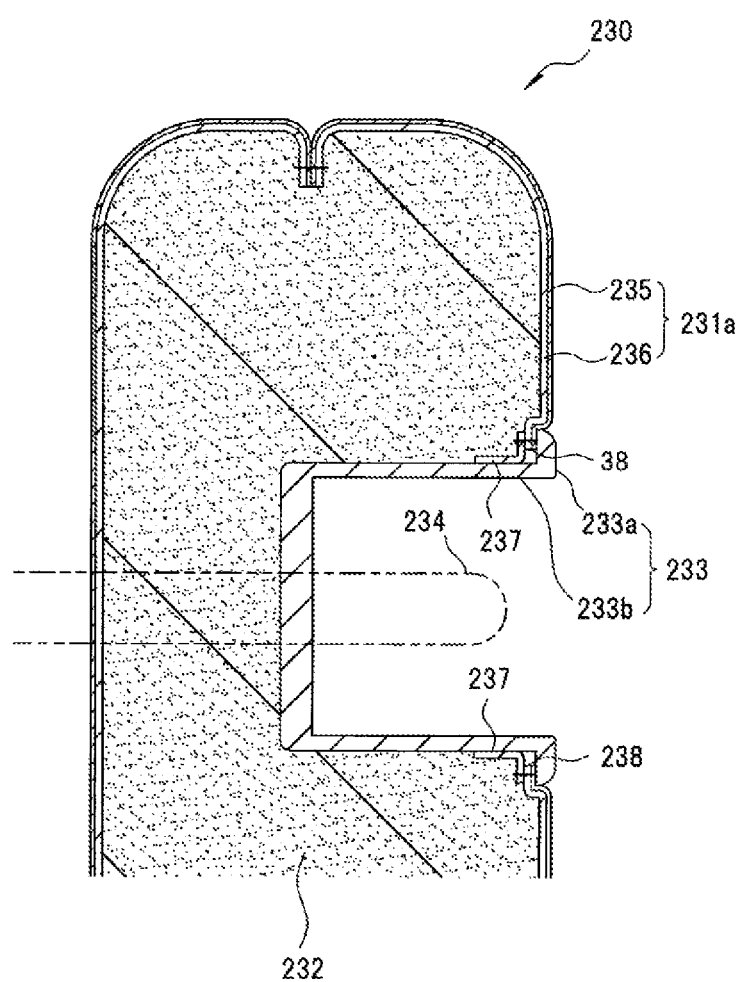
FIG. 26 is a sectional view taken along line XXVI-XXVI of FIG. 25.

FIG. 26 illustrates a sectional surface of the seat cushion 230.

The skin 231 of the seat cushion 230 is formed by sewing a plurality of skin. pieces including the skin piece 231a configuring the seat surface of the seat cushion 230 in a bag shape. The skin piece 231a is formed by two layers of a surface material 235 and a wadding material 236 stacked on the back side of the surface material 235. In this example, the surface material 235 is made of a synthetic leather or a fabric, and the surface material 235 and the wadding material 236 are joined over the entire surface.

A mounting hole 238 in which the guide cup 233 is mounted is formed in the skin piece 231a. The guide cup 233 has a flange 233a which is disposed in overlap with the periphery of the opening of the mounting hole 238 outside the skin 231, and a buried part 233b which is stored in the skin 231 through the mounting hole 238. A sealing part 237 which closely contacts with the outer circumferential surface of the buried part 233b of the guide cup 233 mounted in the mounting hole 238 over the entire circumference is provided in the skin piece 231a.

The sealing part 237 is made of a flexible seat material into which the foam resin material forming the resin foam 232 is impregnable, and is formed in an annular shape corresponding to the shape of the mounting hole 238. Further, the outer periphery of the sealing part 237 is overlapped with the periphery of the opening of the mounting hole 238 on the back side of the skin piece 231a, and is joined with the periphery of the opening of the mounting hole 238. Incidentally, in a case where the wadding material 236 configuring the skin piece 231a is flexible, and the foam resin material is impregnable thereinto, the sealing part 237 may be formed by using the wadding material.

The inner periphery of the sealing part 237 is disposed to extend inside the mounting hole 238 from the periphery of the opening of the mounting hole 238. Further, the inner periphery of the sealing part 237 is pulled in the skin 231 along the outer circumferential surface of the buried part 233b of the guide cup 233 stored in the skin 231 through the mounting hole 238, and closely contacts with the outer circumferential surface of the buried part 233b over the entire circumference in the state of being pulled in.

A process of producing the seat cushion 230 is similar to the process of producing the above-described armrest 210. First, the skin 231 is turned over such that the outlet seam of the skin 231 sewn in a bag shape is positioned on an inside. Next, the buried part 233b of the guide cups 233 is inserted into the skin 231 through the mounting hole 238. At that time, the inner periphery of the sealing part 237, which is disposed to extend inside the mounting hole 238 from the periphery of the opening of the mounting hole 238, is pulled in the skin 231 along the outer circumferential surface of the buried part 233b. Since the sealing part 237 is flexible, the inner periphery of the sealing part 237 pulled in the skin 231 is easily deformed to conform to the shape of the outer circumferential surface of the buried part 233b. Accordingly, an insertion resistance of the buried part 233b into the mounting hole 238 is reduced, and the crumpling or the deformation of the skin 231 according to the insertion of the buried part 233b into the mounting hole 238 is suppressed. Accordingly, the mounting operation of the guide cups 233 into the mounting hole 238 is easily performed.

Subsequently, the foam resin material is injected into the skin 231. The foam resin material is foamed in the skin 231 so that the resin foam 232 is molded. The foam resin material injected into the skin 231 is infiltrated into the sealing part 237, and the foam resin material infiltrated into the sealing part 237 is also foamed. At that time, the sealing part 237 is inflated according to the foaming of the foam resin material infiltrated into the sealing part 237. The inner periphery of the sealing part 237 is pushed by the outer circumferential surface of the buried part 233b, and is tightly brought into close contact with the outer circumferential surface of the buried part 233b over the entire circumference. Accordingly, the leakage of the foam resin material from the mounting hole 238 is suppressed.

The seat cushion 230 is obtained by the above process. Thereafter, the notch through which the anchor 234 is inserted is formed over the skin 231, the resin foam 232, and the guide cups 233.

Incidentally, similarly to a modification of the armrest 210 illustrated in FIG. 23, an annular recess portion is provided in the outer circumferential surface of the buried part 233b of the guide cups 233 with which the inner periphery of the sealing part 237 closely contacts, and at least a portion of the inner periphery of the sealing part 237 may be contained in the recess portion. Accordingly, the leakage of the foam resin material from the mounting hole 238 can be further suppressed.

Similarly to the modification of the armrest 210 illustrated in FIG. 24, in a case where the surface material 235 configuring the skin piece 231a is made of a natural leather, and the surface material 235 and the wadding material 236 are in a non-surface joined state, the mounting hole 238 is formed in the surface material 235, and the through hole smaller than the mounting hole 238 is formed in the wadding material 236. An extension part which is disposed to extend inside the mounting hole 238 from the periphery of the opening of the mounting hole 238 is provided in the wadding material 236, the extension part serves as the sealing part 237, and the sealing part 237 may be formed integrally with the wadding material 236. Accordingly, an operation to join the sealing part 237 formed separately from the wadding material 236 with the skin piece 231a can be omitted, and an efficiency of producing the seat cushion 230 can be improved.

Figure 27:
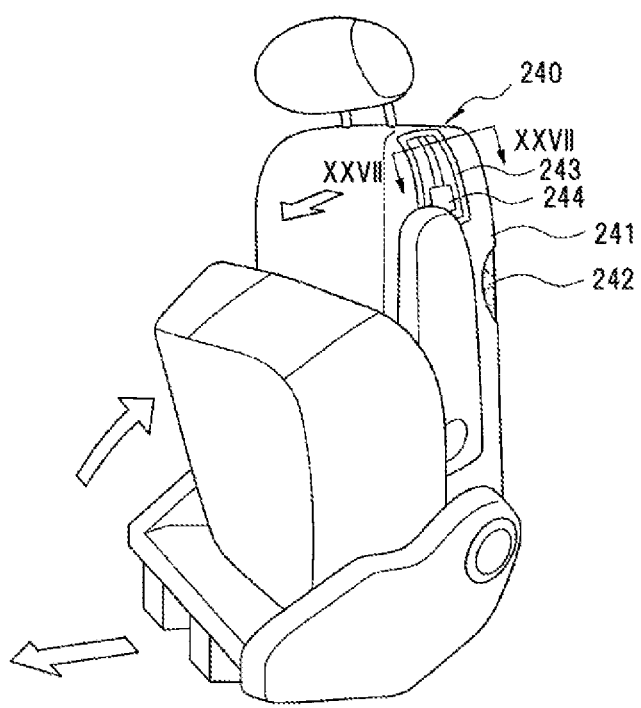
FIG. 27 is a perspective view of a seat back of the vehicle seat as another example of the integral skin foam molded article for explaining the embodiment of the present invention.

FIG. 27 illustrates another example of the integral skin foam molded article for explaining the embodiment of the present invention.

The integral skin foam molded article illustrated in FIG. 27 is a seat back 240 of the vehicle seat including a walk-in mechanism. A lever 244 as an operation part of the walk-in mechanism is provided in the upper end of the side surface of the seat back 240. The seat back 240 is inclined forward by operating the lever 244, the seat cushion is flipped up, and further the entire seat is slid forward.

The seat back 240 includes a skin 241, a resin foam 242 which is filled in the skin 241, and a lever housing 243 as a component mounted in the skin 241. In the lever housing 243, the operation part of the lever 244 which is disposed in the upper end of the side surface of the seat back 240 is exposed to contain the rod part of the lever 244.

Figure 28:
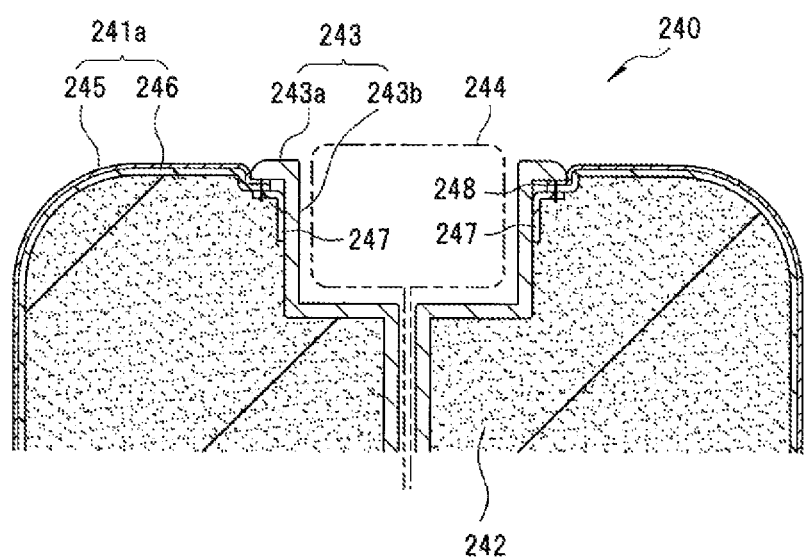
FIG. 28 is a sectional view taken along line XXVII-XXVII of FIG. 27.

FIG. 28 illustrates a sectional surface of the seat back 240.

The skin 241 of the seat back 240 is formed by sewing a plurality of skin pieces including the skin piece 241a configuring the side surface of the seat back 240 in a bag shape.

The skin piece 241a is formed by two layers of a surface material 245 and a wadding material 246 stacked on the back side of the surface material 245. In this example, the surface material 245 is made of a synthetic leather or a fabric, and the surface material 245 and the wadding material 246 are joined over the entire surface.

A mounting hole 248 in which the lever housing 243 is mounted is formed in the skin piece 241a. The lever housing 243 has a flange 243a which is disposed in overlap with the periphery of the opening of the mounting hole 248 outside the skin 241, and a buried part 243b which is stored in the skin 241 through the mounting hole 248. A sealing part 247 closely contacting with the outer circumferential surface of the buried part 243b of the lever housing 243 mounted in the mounting hole 248 over the entire circumference is provided in the skin piece 241a.

The sealing part 247 is made of a flexible seat material into which the foam resin material forming the resin foam 242 is impregnable, and is formed in an annular shape corresponding to the shape of the mounting hole 248. Further, the outer periphery of the sealing part 247 is overlapped with the periphery of the opening of the mounting hole 248 on the back side of the skin piece 241a, and is joined with the periphery of the opening of the mounting hole 248. Incidentally, in a case where the wadding material 246 configuring the skin piece 241a is flexible, and the foam resin material is impregnable thereinto, the sealing part 247 may be formed by using the wadding material.

The inner periphery of the sealing part 247 is disposed to extend inside the mounting hole 248 from the periphery of the opening of the mounting hole 248. Further, the inner periphery of the sealing part 247 is pulled in the skin 241 along the outer circumferential surface of the buried part 243b of the lever housing 243 stored in the skin 241 through the mounting hole 248, and closely contacts with the outer circumferential surface of the buried part 243b over the entire circumference in the state of being pulled in.

A process of producing the seat back 240 is similar to the process of producing the above-described armrest 210. First, the skin 241 is turned over such that the outlet seam of the skin 241 sewn in a bag shape is positioned on an inside. Next, the buried part 243b of the lever housing 243 is inserted into the skin 241 through the mounting hole 248. At that time, the inner periphery of the sealing part 247, which is disposed to extend inside the mounting hole 248 from the periphery of the opening of the mounting hole 248, is pulled in the skin 241 along the outer circumferential surface of the buried part 243b. Since the sealing part 247 is flexible, the inner periphery of the sealing part 247 pulled in the skin 241 is easily deformed to conform to the shape of the outer circumferential surface of the buried part 243b. Accordingly, an insertion. resistance of the buried part 243b into the mounting hole 248 is reduced, and the crumpling or the deformation of the skin 241 according to the insertion of the buried part 243b into the mounting hole 248 is suppressed. Accordingly, the mounting operation of the lever housing 243 into the mounting hole 248 is easily performed.

Subsequently, the foam resin material is injected into the skin 241. The foam resin material is foamed in the skin 241, so that the resin foam 242 is molded. The foam resin material injected into the skin 241 is infiltrated into the sealing part 247, and the foam resin material infiltrated into the sealing part 247 is also foamed. At that time, the sealing part 247 is inflated according to the foaming of the foam resin material infiltrated into the sealing part 247. The inner periphery of the sealing part 247 is pushed by the outer circumferential surface of the buried part 243b, and is tightly brought into close contact with the outer circumferential surface of the buried part 243b over the entire circumference. Accordingly, the leakage of the foam resin material from the mounting hole 248 is suppressed.

Incidentally, similarly to the modification of the armrest 210 illustrated in FIG. 23, an annular recess portion is provided in the outer circumferential surface of the buried part 243b of the lever housing 243 with which the inner periphery of the sealing part 247 closely contacts, and at least a portion of the inner periphery of the sealing part 247 may be contained in the recess portion. Accordingly, the leakage of the foam resin material from the mounting hole 248 can be further suppressed.

Similarly to the modification of the armrest 210 illustrated in FIG. 24, in a case where the surface material 245 configuring the skin piece 241a is made of a natural leather, and the surface material 245 and the wadding material 246 are in a non-surface joined state, the mounting hole 248 is formed in the surface material 245, and the through hole smaller than the mounting hole 248 is formed in the wadding material 246. An extension part which is disposed to extend inside the mounting hole 248 from the periphery of the opening of the mounting hole 248 is provided in the wadding material 246, the extension part serves as the sealing part 247, and the sealing part 247 may be formed integrally with the wadding material 246. Accordingly, an operation to join the sealing part 247 formed separately from the wadding material 246 with the skin piece 241a can be omitted, and an efficiency of producing the seat back 240 can be improved.

Hereinbefore, the embodiment of the present invention has been described about the armrest 210, the seat cushion 230, and the seat back 240 as an example. The present invention may be applied to another integral skin foam molded article of the vehicle seat which is a headrest has an adjustable height, for example, a headrest in which a bezel containing an operating button is mounted. Further, the present invention is not limited to the components of the vehicle seat, and may be applied also to another integral skin foam molded article.

What is claimed is:

1. An integral skin foam molded article comprising:
   a skin formed by sewing a plurality of skin pieces in a bag shape; and
   a resin foam which is molded inside the skin integrally with the skin, wherein:
   at least one skin piece among the plurality of skin pieces has a surface material made of a natural leather, and includes a wadding material stacked on a back side of the surface material in a non-surface joined state and a lining material stacked on the wadding material; and
   in a shrinkage rate with respect to an in-plane compression load, a shrinkage rate of the lining material is smaller than a shrinkage rate of the wadding material.

2. The integral skin foam molded article according to claim 1, wherein the wadding material and the lining material are surface-joined.

3. The integral skin foam molded article according to claim 1, wherein the lining material is a non-woven fabric.

4. The integral skin foam molded article according to claim 1, wherein:
   in a flexibility against bending, the wadding material is more flexible than the lining material; and
   at least a portion of the skin piece including the natural leather, the wadding material, and the lining material is curved, and in a curved portion of the skin piece, the wadding material and the lining material are joined at least partially.

5. The integral skin foam molded article according to claim 4, wherein
the wadding material and the lining material are surface-joined.

6. The integral skin foam molded article according to claim 4, wherein
the lining material is a non-woven fabric.

* * * * *